US010001640B1

(12) United States Patent
Kumar et al.

(10) Patent No.: US 10,001,640 B1
(45) Date of Patent: Jun. 19, 2018

(54) RELOCATING COMMON CONNECTOR PADS IN DISPLAY DEVICES

(71) Applicant: Amazon Technologies, Inc., Seattle, WA (US)

(72) Inventors: Abhishek Kumar, Tilburg (NL); Toru Sakai, Waalre (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 15 days.

(21) Appl. No.: 15/193,855

(22) Filed: Jun. 27, 2016

(51) Int. Cl.
*G02B 26/00* (2006.01)
*G02B 5/20* (2006.01)
*G09G 3/34* (2006.01)

(52) U.S. Cl.
CPC ........... *G02B 26/005* (2013.01); *G02B 5/201* (2013.01); *G09G 3/348* (2013.01); *G02B 2207/115* (2013.01)

(58) Field of Classification Search
CPC ........... G02F 1/13624; G02F 1/136286; G02F 2001/134345; G02F 1/136213; G02F 1/136227; G02F 1/1368; G02F 2001/13685; G02F 1/133553; G02F 1/133555; G02F 1/136259; G02F 2001/136231; G02F 1/133514; G02F 1/134309; G02F 2001/136268; H01L 27/124; H01L 27/1225; H01L 27/1214; H01L 27/1288; H01L 27/3265; H01L 27/3276; H01L 27/12; H01L 27/1237; H01L 27/1251; H01L 27/1255; H01L 2924/0002; H01L 29/78606; H01L 29/7869; H01L 21/0274; H01L 21/32139; H01L 27/1262
USPC ....... 359/290–292, 296, 295, 298, 237, 246, 359/247, 265, 267
See application file for complete search history.

(56) References Cited

U.S. PATENT DOCUMENTS

| | | | |
|---|---|---|---|
| 6,246,459 B1 * | 6/2001 | Simhambhatla | G02F 1/133308 349/149 |
| 2012/0287364 A1 * | 11/2012 | Peng | H01L 29/4908 349/43 |
| 2016/0254336 A1 * | 9/2016 | Zhang | G02F 1/134309 349/33 |

* cited by examiner

*Primary Examiner* — Brandi Thomas
(74) *Attorney, Agent, or Firm* — Quarles & Brady LLP

(57) ABSTRACT

A pixel-based display device, such as an electrowetting display, includes an array of routing dummy pixels that are electrically interconnected in series, forming a conductive routing trace through the pixel area. Within the routing dummy pixel substrate, a source-drain metal layer is electrically isolated from a gate metal layer. A source metal interconnect between the source-drain metal layers of vertically adjacent routing dummy pixels electrically connects the vertically adjacent routing dummy pixels in series. The routing trace conducts a common voltage from a power supply to a common connector pad, facilitating relocation of the pad from the bottom to the top of the display. The pad and the source-drain and reflector metal layers of the routing dummy pixels have the same electric potential, ensuring that the routing dummy pixels remain in an "off" state and appear black throughout operation of the display device.

20 Claims, 11 Drawing Sheets

RELOCATING COMMON CONNECTOR PADS IN DISPLAY DEVICES

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the kind and purpose of the associated device.

The appearance and quality of a display may affect a user's experience with the electronic device and the content presented thereon. Furthermore, increased multimedia use imposes high demands on designing, packaging, and fabricating display devices. As content available for mobile use becomes more extensive and device portability continues to be a high priority to the consumer, display manufacturers continue to reduce the dimensions of a display while retaining the size and resolution of the image; space outside of the pixel area for positioning essential circuit components is becoming more and more limited.

An electrowetting display includes an array of pixels individually bordered by pixel walls that retain fluid, such as an opaque oil, for example. Light transmission through each pixel is adjustable by electronically controlling a position of the fluid in the pixel. Due to fabrication techniques, electrowetting and other pixel-based displays often have malfunctioning or poor-quality pixels near the edges of the pixel area. As a result, several rows (at the top and bottom) and columns (at the left and right sides) of pixels at the edges of the pixel area are rendered into "dummy" pixels that remain black throughout operation of the display, creating a border around the active pixel area.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
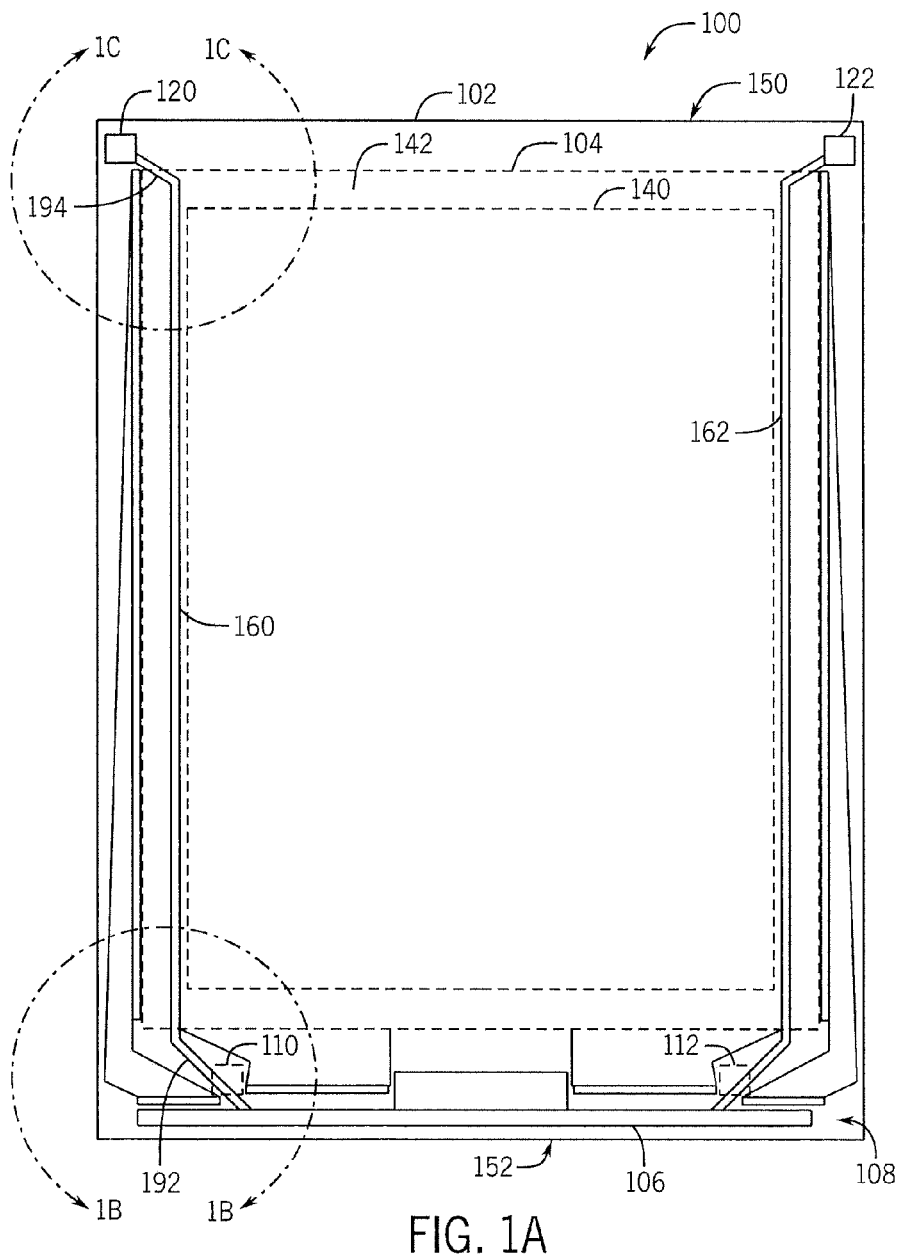
FIG. 1A is a diagram illustrating a plan view of a front of an example display.

In various embodiments described herein, an electronic device includes a display device (herein, "display") for presenting content and other information in the form of images generated by emission and/or reflection of light from a matrix of pixels. The matrix can include hundreds of thousands or millions of pixels arranged in rows and columns and determining the maximum resolution of the image. In some examples, the electronic devices may include one or more components associated with one or more types of pixel-based displays, such as liquid crystal displays, light-emitting diode displays, plasma displays, and electrowetting displays; examples of such components include a touch sensor component layered atop the display for detecting touch inputs, a front light or back light component for lighting the display, a cover layer component having antiglare, antireflective, anti-fingerprint, and/or anti-cracking properties, and the like.

A display may be a transmissive, reflective, or transflective display that generally includes an array of pixels configured to be operated by an active matrix addressing scheme. Rows and columns of pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) included in each active pixel (i.e., each pixel that contributes to producing the image). The transistors take up a relatively small fraction of the area of each active pixel to allow light to efficiently pass through (or reflect from) the active pixel. Components of the display for implementing the addressing scheme may be common among or unique to certain types of displays. Non-limiting examples include a power supply powering the addressing components, a display controller for controlling timing and signal levels, various driver circuits that distribute and apply voltages across signal lines, and a foil track, conductive trace, or other electrical connection between the power supply and the various powered components. Such components may be modified or reconfigured in various embodiments herein.

With respect to the above-mentioned difficulties of fabricating displays, a display design must balance desired reductions in height, width, and depth of a display against the minimum space needed to arrange the necessary circuit components on a circuit board, support plate, or other panel of the display. The pixel area covers most of the surface of the panel. The circuit components are relegated to a ledge at the bottom of the panel. An electrical connection, such as a conductive trace running across all or a portion of the panel near the bottom edge, connects to circuit components, as described below, and to the display power supply, providing power to the connected circuit components. The source and gate lines, which can number in the thousands, fan out from the electrical connection and occupy most of the ledge. This leaves little room for driver circuits and other circuit components. If the circuit components are too close together and their conductive paths come in contact, short circuits and other damage may result.

Figure 1B:
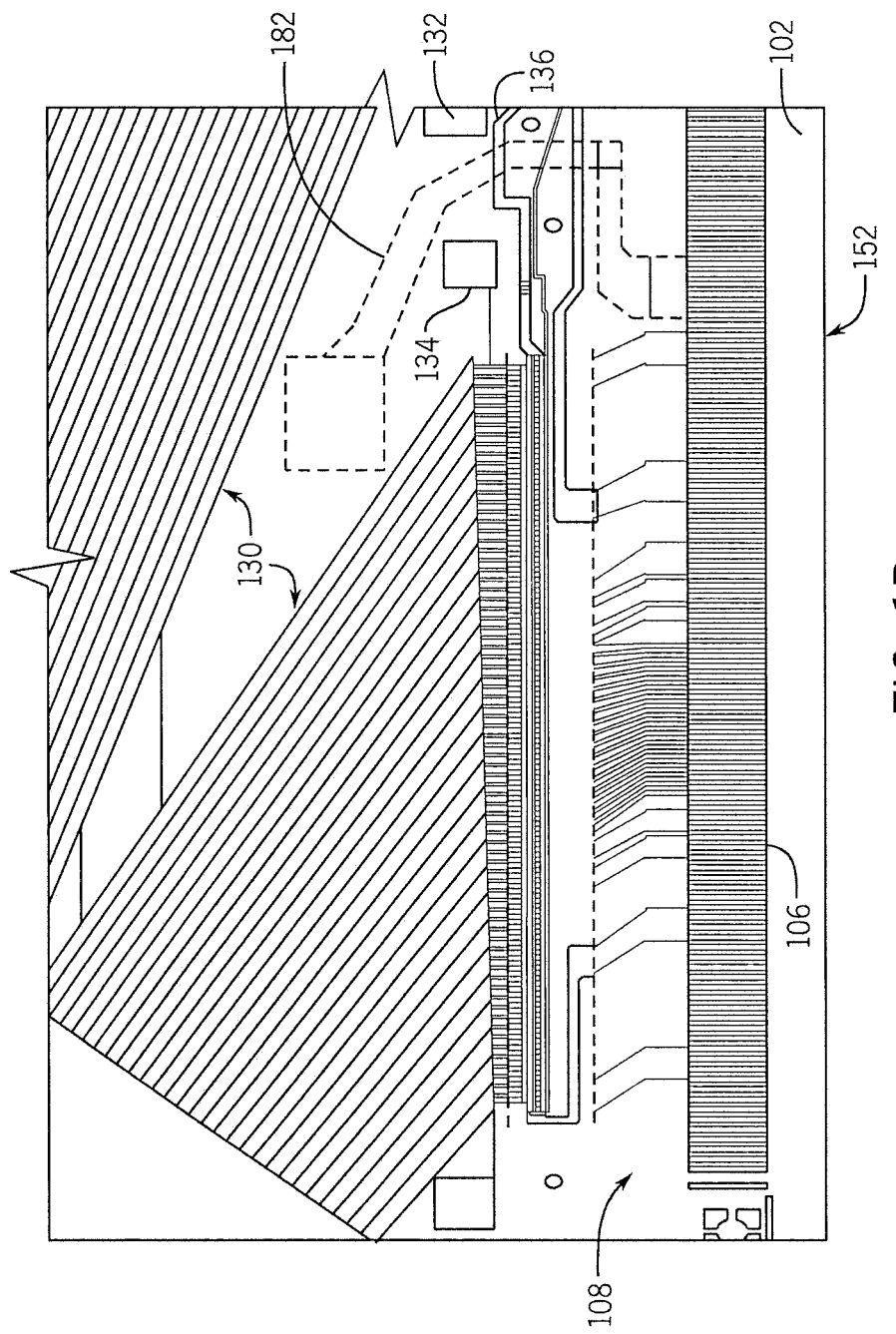
FIG. 1B is a close-up view of inset 1B of FIG. 1A.
Figure 1C:
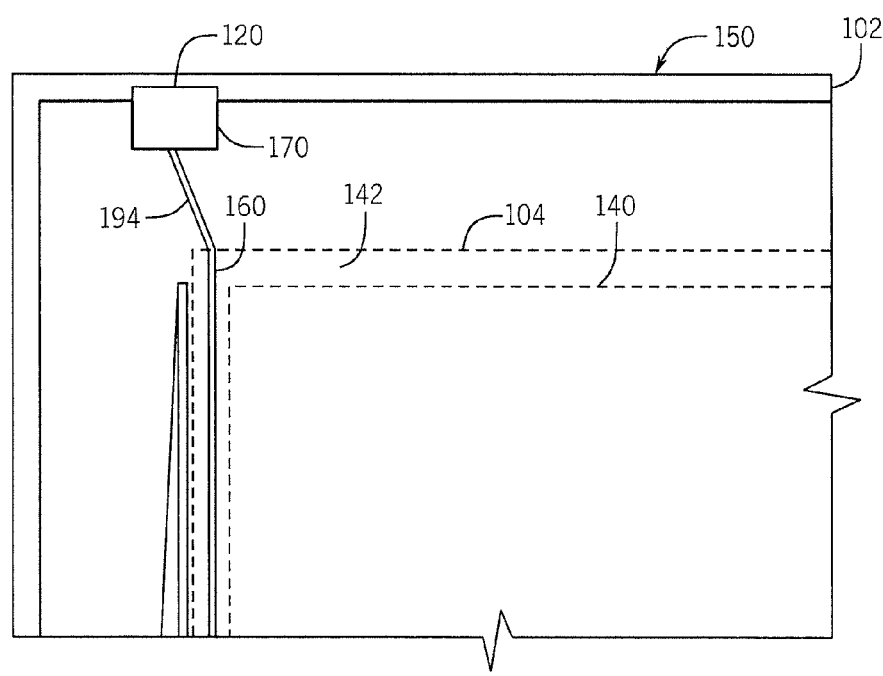
FIG. 1C is a close-up view of inset 1C of FIG. 1A.

Referring to FIGS. 1A-C, a display 100 in accordance with the present disclosure provides a solution to the above potential drawback prevalent in existing electrowetting displays. The pixels within the pixel area 104 of the display 100 are sandwiched between two support plates, such as a bottom support plate 102 and a top support plate (not shown). For example, a bottom support plate 102 in cooperation with a top support plate may contain pixels that include electrowetting oil, electrolyte solution and pixel walls between the support plates. Support plates may include glass, plastic (e.g., a transparent thermoplastic such as a poly(methyl methacrylate) (PMMA) or other acrylic), or other transparent material and may be made of a rigid material or a flexible material, for example. Other example embodiments include, but are not limited to, reflective electrowetting displays that include a clear, transparent, or semi-transparent top support plate and a bottom support plate 102, which need not be transparent. The clear top support plate may comprise glass or any of a number of transparent materials, such as transparent plastic, quartz, and semiconductors.

The circuit components may be disposed on the top or bottom support plate 102, and may include one or more common connector (CoCo) pads 110, 112, 120, 122 that receive a common voltage via an electrical connection 106 and electrically connect the top support plate and the bottom support plate 102. The broken-line CoCo pads 110, 112 represent the location in previous designs of the CoCo pads approximate the electrical connection 106 on the contact ledge 108 at the bottom edge 152 of the support plate 102. The solid-line CoCo pads 120, 122 indicate the location of the CoCo pads in the present display 100 design, approximate the top edge 150 of the support plate 102 as described below. Typically, two CoCo pads 110, 112, 120, 122 are positioned near opposite corners of the support plate in order to equalize distribution of the common voltage; this also allows resistances of the CoCo pads 110, 112, 120, 122 to be measured and compared to detect malfunctions. The CoCo pads 110, 112, 120, 122 may be adhered to the support plate 102 with silver paste.

The problem arises when the previous CoCo pads 110, 112 are forced too close to surrounding components, such as fan-outs 130, test pads 132, driver circuits 134, and bonding pads 136. The silver paste can spread outside of the previous CoCo pad 110 and impinge a nearby conductive component, potentially causing short-circuits and other damage. Existing displays have to be manually inspected during manufacture, so that bonding pads 136 and other conductive elements can be cleaned of any migrated silver paste. This adds significant overhead to the manufacturing process. Locating the CoCo pads 110, 112 off of the contact ledge 108 a greater distance from the electrical connection 106 and other components would require adding a conductive trace or other electrical connector outside of the pixel area 104 to connect the CoCo pads 110, 112 to the electrical connection 106. There is so little available space on the support plate 102 that the support plate 102, and thus the display 100, would have to be enlarged to accommodate the additional vertical trace outside of the pixel area 104.

In the present system, novel pixel structures are employed to form a routing trace 160 that conducts an electric current through the pixel area 104, rather than around it. The routing trace 160 may electrically connect at a first end to the electrical connection 106 and then may extend from the bottom to the top of the pixel area 104. The CoCo pad 120 is relocated to the top of the support plate 102 or other panel and electrically connects to a second end of the routing trace 160. The routing trace 160 may conduct the common voltage from the electrical connection 106 to the CoCo pad 120 without disrupting image generation by the active pixels disposed in an active area 140 of the pixel area 104. This is achieved by configuring the pixels of the routing trace 160, referred to herein as "routing dummy pixels," to mirror the display behavior of dummy pixels—that is, to maintain a black appearance throughout operation of the display—and implementing the routing trace 160 within the border 142 formed around the active area 140 by the dummy pixels.

Multiple arrays of routing dummy pixels can form additional routing traces (e.g., a second routing trace 162) that conduct an electric current to other circuit components, such as to a second CoCo pad 122 relocated to the top of the support plate 102. In various embodiments, routing traces may be vertical (i.e., from bottom to top of the support plate 102 or vice versa) and/or horizontal (i.e., from left to right of the support plate 102 or vice versa) as facilitated by routing dummy pixel configurations described below. In some embodiments, one or more of the routing traces may be formed through the active area 140 by replacing some of the active pixels with routing dummy pixels. Of course, the corresponding pixels would no longer contribute to the production of the image and could cause a visible black line in the viewing area.

Some embodiments of the display 100 may include a dam 170 disposed around all or a portion of the CoCo pad 110. The dam 170 may be a raised edge configured to prevent spreading of the silver paste (not shown) toward circuit components disposed approximate the top edge 150 of the support plate 102. The dam 170 may be as little as two micrometers in height, or may be about five micrometers (similar to the pixel walls), or may be higher as supported by the display 100 configuration. The dam 170 may be formed on the surface of the support plate 102 like a pixel wall as described below.

Figure 2A:
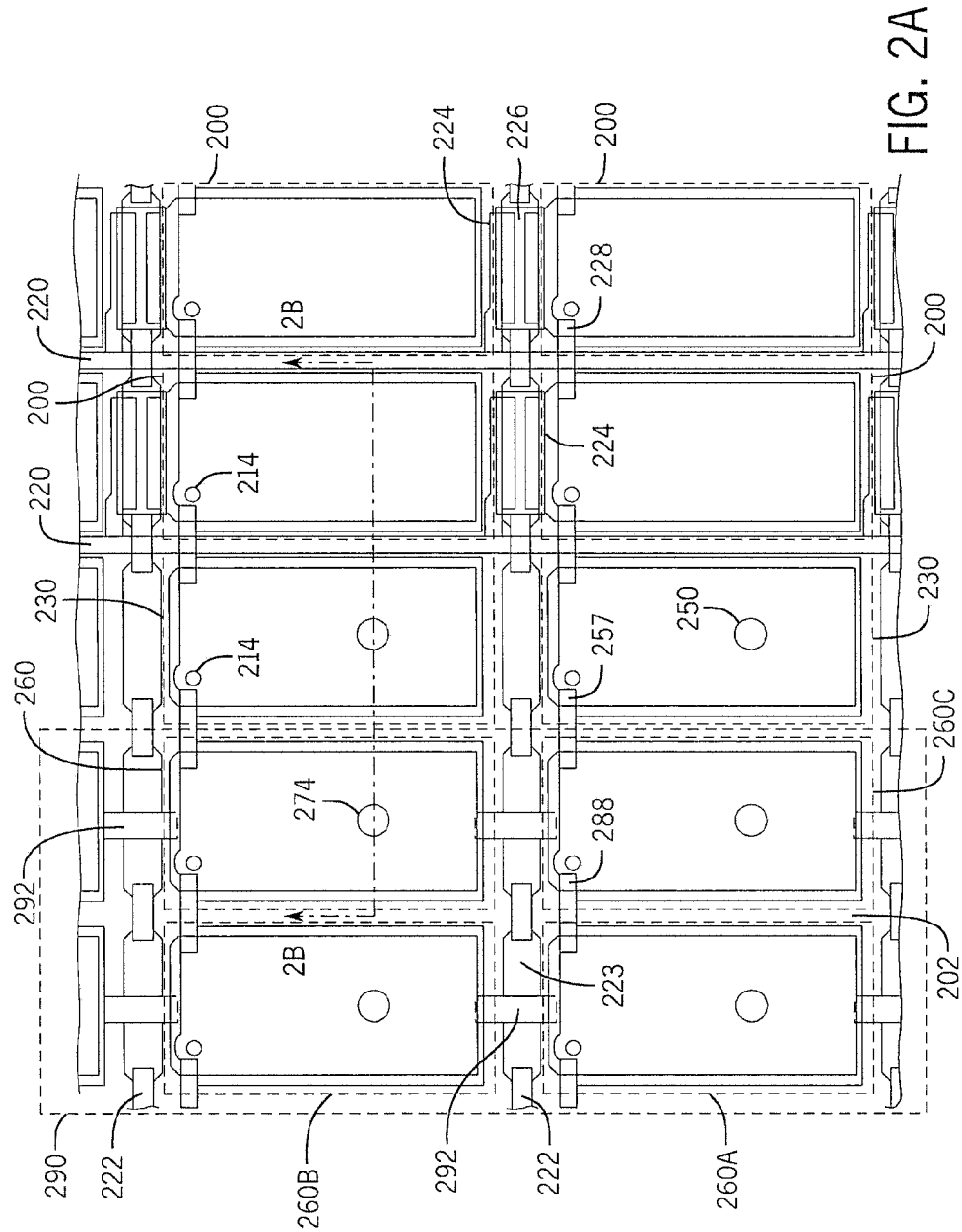
FIG. 2A is a diagram illustrating a plan view of a plurality of pixels and circuit components in another example display.
Figure 2B:
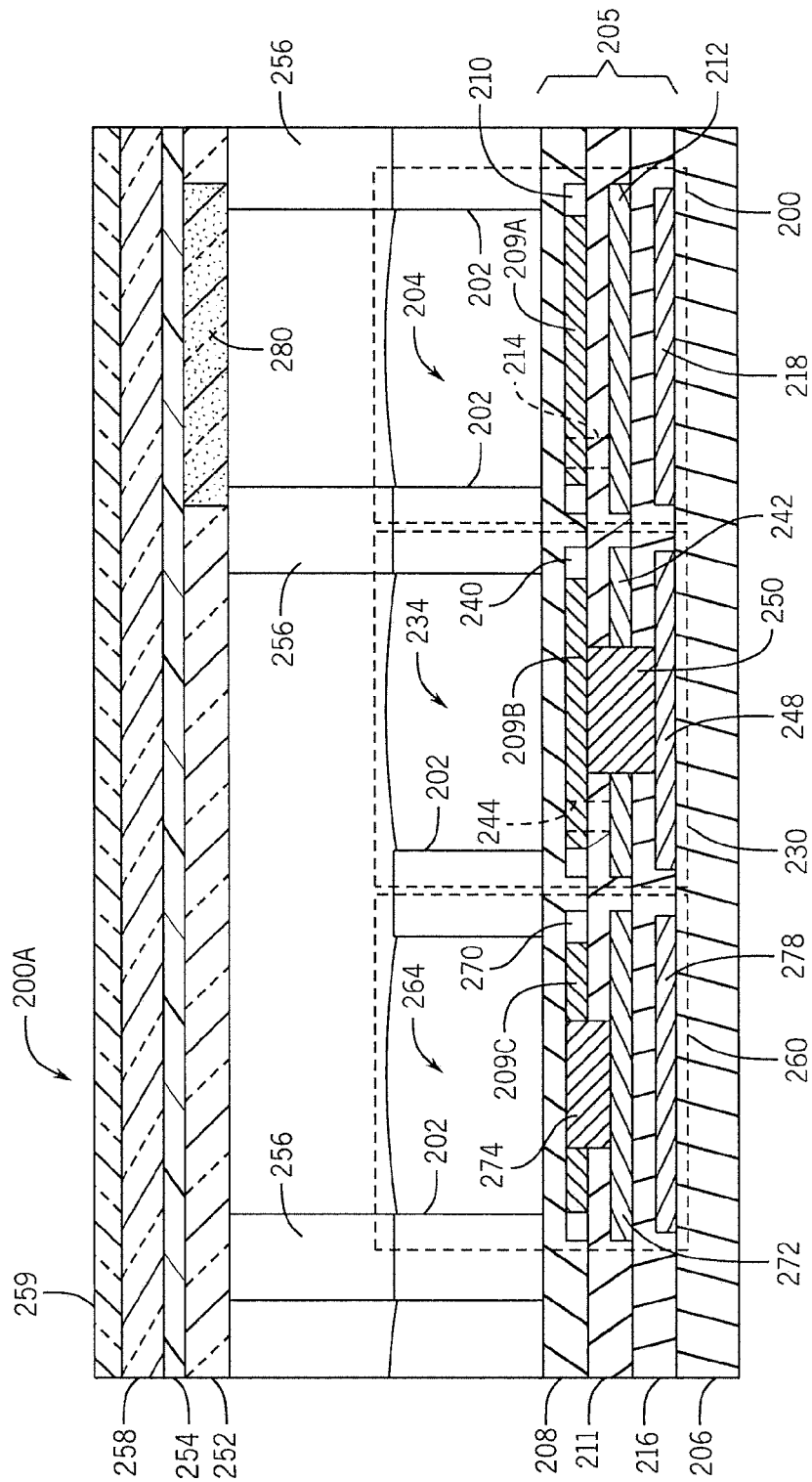
FIG. 2B is a diagram illustrating the pixels of FIG. 2A in an inactive state, in cross-section taken along line 2B-2B of FIG. 2A.
Figure 2C:
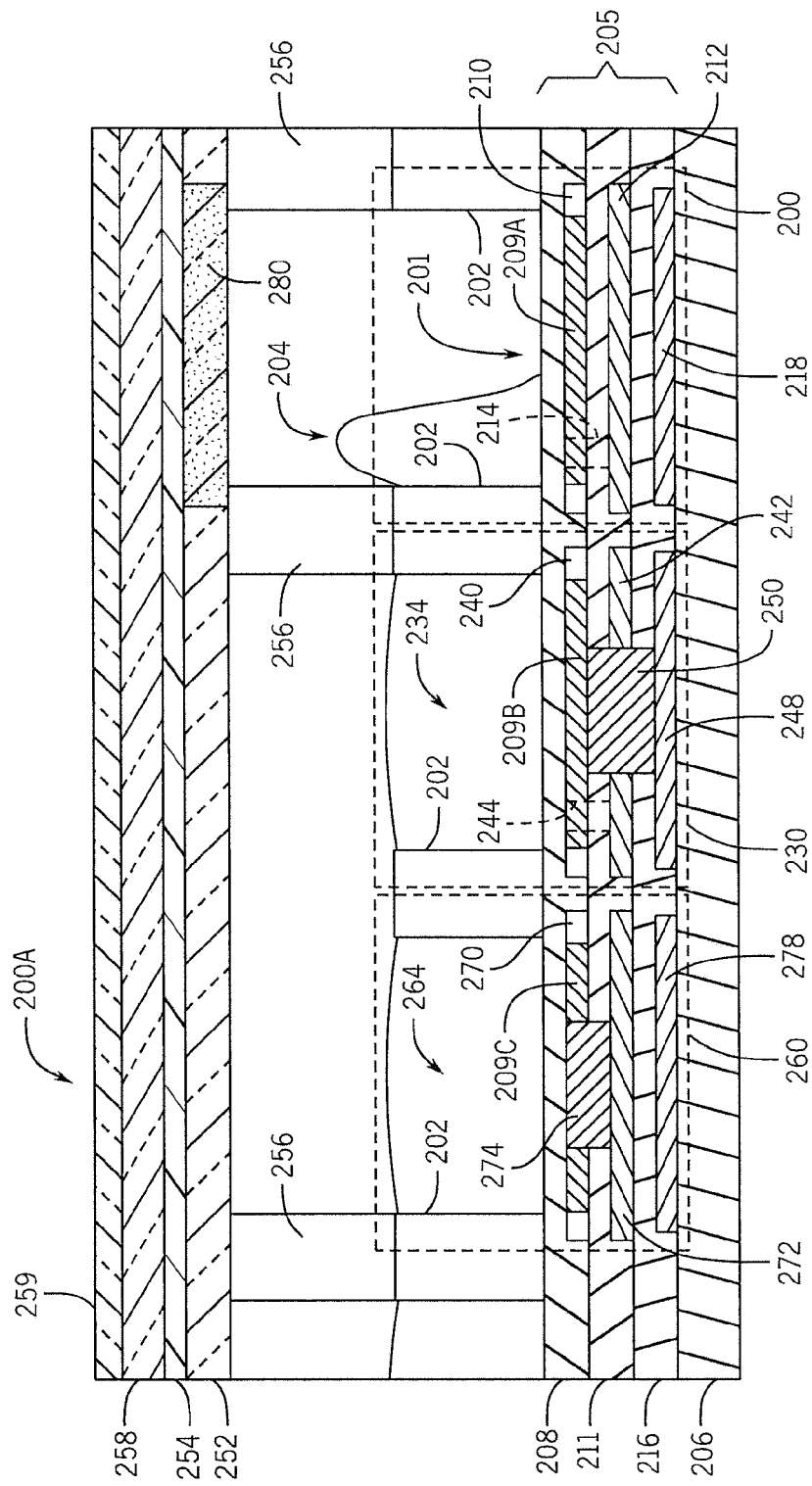
FIG. 2C is a diagram illustrating the pixels of FIG. 2A with active pixels in an active state, in cross-section taken along line 2B-2B of FIG. 2A.

Referring to FIGS. 2A-C, various embodiments herein describe elements, and/or novel modifications or additions thereto, within the structure or with respect to the operation of a pixel 200, 230 260 itself. Such elements can have common, similar, or equivalent counterparts between different types of pixel-based displays. Examples may be described with respect to a particular type of display, such as an electrowetting display, with the understanding that modifications, additions, and/or configurations of pixels in other types of pixel-based displays can be executed in the same or a substantially similar manner. In this disclosure, a pixel may, unless otherwise specified, comprise a single sub-pixel or a pixel that includes two or more sub-pixels of an electrowetting display device. Such a pixel or sub-pixel may be the smallest light transmissive, reflective or transflective element of a display that is individually operable to directly control an amount of light transmission through and/or reflection from the element. For example, in some implementations, a pixel may be a red sub-pixel, a green sub-pixel, a blue sub-pixel or a white sub-pixel of a larger pixel or may, in some cases, include a number of sub-pixels. As such, a pixel may be a pixel that is a smallest component, e.g., the pixel does not include any sub-pixels.

Embodiments of novel pixel structures are described with respect to electrowetting displays. An active pixel 200 in an electrowetting display may include a number of pixel walls 202. The pixel walls 202 may be fabricated using any suitable process for forming and shaping pixel wall structures, including without limitation lithography, embossing, imprinting and electroforming. The pixel walls 202 may cooperate to contain at least a portion of a first fluid 204. Correspondingly, the pixel walls 202 may be a suitable height to retain the first fluid 204, such as between two and five microns. The first fluid 204 may be opaque, or light-absorbing. An "opaque" or "light-absorbing" fluid, as described herein, is used to describe a fluid that appears black or to have color to an observer. For example, an opaque fluid appears black to an observer when it strongly absorbs a broad spectrum of wavelengths (e.g., including those of red, green and blue light) in the visible region of light or electromagnetic radiation. In some embodiments, the first fluid 204 is a nonpolar electrowetting oil. Light transmission through the active pixel 200 can be controlled by an application of an electric potential to the active pixel 200, which results in a movement of a second fluid (not shown), such as an electrolyte solution, within the electrowetting pixel, thereby displacing the first fluid 204. The second fluid may be transparent, but may be colored, or light-absorbing in some embodiments. The second fluid is immiscible with the first fluid 204.

When the active pixel 200 is in a rest state (i.e., with no electric potential applied or at an electric potential that falls below a threshold value, causing the active pixel 200 to be inactive), shown in FIG. 2B, the first fluid 204 is distributed throughout the pixel 200. The first fluid 204 absorbs light and the pixel 200 in this condition appears black. But when the electric potential is applied, the first fluid 204 is displaced to one or more sides of the pixel 200 as shown by example in FIG. 2C. Light 201 can then enter the pixel 200 striking a reflective surface (e.g., a reflector metal layer 210, described below). The light then reflects out of the pixel 200, causing the pixel 200 to appear less dark (e.g., white) to an observer. If the reflective surface only reflects a portion of the spectrum of visible light or if color filters are incorporated into the pixel 200 structure, the pixel 200 may appear to have color.

An active pixel 200 includes a substrate 205 that includes various layers of materials built upon the surface of a support plate 206, such as the bottom support plate 102 of FIG. 1A. One example layer is a hydrophobic layer 208, e.g. a fluoropolymer layer, around portions of which pixel walls 202 are built. The first fluid 204 and/or second fluid may rest on the hydrophobic layer 208. Another example layer is a reflective, or reflector metal, layer 210 having the reflective surface described above. The reflector metal layer 210 may further include a pixel electrode 209A, or an electrode layer (not shown) acting as the pixel electrode may be adjacent to the reflector metal layer 210. A voltage applied to the pixel electrode (e.g., to the reflector metal layer 210) electrically attracts the second fluid, which moves the first fluid 204 and reduces its coverage of the reflector metal layer 210 as shown in FIG. 2C, increasing the amount of light incident on the reflector metal layer 210. Another example layer is a source-drain metal layer 212 electrically connected to the pixel electrode (e.g., to the reflector metal layer 210) and to a source line 220. The source-drain metal layer 212 receives the voltage that is applied to the pixel electrode from the connected source line 220, provided the corresponding switch is closed as described below. The source-drain metal layer 212 and the pixel electrode 209A (e.g., formed in the reflector metal layer 210) may be separated by an insulating layer 211 but may be electrically connected by a conductive via 214 that is disposed through at least the insulating layer 211 and contacts a conductive structure of the reflector metal layer 210, and may penetrate any other layers above the source-drain metal layer 212. The via 214 contacts a conductive component of the source-drain metal layer 212 but does not penetrate through the source-drain metal layer 212.

An electrically insulating layer 216 electrically isolates the source-drain metal layer 212 from a gate metal layer 218. The gate metal layer 218 may be electrically connected to a gate line 222. In an inactive state, current does not travel through the source-drain metal layer 212. When a gate signal on the gate line 222 applies a sufficiently high voltage to the gate metal layer 218, the source line 220 voltage is applied to the source-drain metal layer 212 and to the pixel electrode. This may be achieved with a thin-film transistor (TFT) 224, which is electrically connected to the source line 220 and gate line 222 and may be entirely or partially incorporated within the pixel 200 or disposed outside of the pixel 200. The TFT 224 may be formed partially from either or both of the source-drain metal layer 212 and the gate metal layer 218. The TFT 224 may further include a semiconductive layer 226 that, in response to the gate signal on the gate line 222, carries the source line 220 voltage across a gap in the source-drain metal layer 212 via field effect. Thus, TFT 224 switches the active pixel 200 on and off. Adjacent active pixels 200 that are addressed by the same gate line 222 may be electrically interconnected at the gate metal layer 218 by a gate-level interconnect 228. This interconnect may create a sub-gate line that allows the active pixels 200 to be reset after they are activated; the sub-gate line may extend through the dummy pixels 230 and/or the routing dummy pixels 260.

Existing dummy pixels 230 have a different structure that does not require a TFT and is not connected to a source line or to the gate line 222 for the corresponding pixel row, so that the dummy pixel 230 remains in the inactive or off state in which the opaque first fluid 234 entirely obscures the dummy pixel's 230 reflective surface and the dummy pixel 230 appears black. Nevertheless, for manufacturing and functional efficiencies the dummy pixel 230 includes some elements in common with an active pixel 200. These include pixel walls 202, a first fluid 234 and second fluid (not shown), and a substrate 205 including the hydrophobic layer 208, a reflector metal layer 240 including a pixel electrode 209B, insulating layer 211, a source-drain metal layer 242, a first conductive via 244 connecting the source-drain metal layer 242 to the to the pixel electrode 209B, the second insulating layer 216, a gate metal layer 248, and a gate-level interconnect 257 as described above. Although the pixel electrode 209B does not receive an electric current from a source line, photons from light incident on the dummy pixel 230 can cause a charge to build up on the pixel electrode 209B. This charge can get high enough that the dummy pixel 230 discharges, causing the second fluid to move the first fluid 234 and allow light to impinge the reflective surface of the dummy pixel 230. To dissipate the charge, the dummy pixel 230 includes a second conductive via 250 disposed through at least the insulating layer 211, the source-drain metal layer 242, and the second insulating layer 216, electrically connecting together the gate metal layer 248, the source-drain metal layer 242, and (optionally) the pixel electrode 209B. As a result, the source-gate metal layer 242, gate layer 248, and pixel electrode 209B are always at the same potential, specifically the common voltage.

A routing dummy pixel 260 in accordance with the disclosure has a different structure than both the existing dummy pixels 230 and the active pixels 200. Like a dummy pixel 230, a routing dummy pixel 260 does not have an associated TFT and may be disconnected from any source line, and may further be disconnected from the gate line 222 of the pixel row. In some embodiments, the routing dummy pixel 260 may have pixel walls 202, a first fluid 264 and second fluid (not shown), and a substrate 205 including a the hydrophobic layer 208, a reflector metal layer 270 including a pixel electrode 209C, the insulating layer 211, a source-drain metal layer 272, a first conductive via 274 connecting the source-drain metal layer 272 to the pixel electrode 209C, a second insulating layer 216, a gate metal layer 278, and a gate-level interconnect 288 as described above. The gate-level interconnect 288 between routing dummy pixels may further be used to create a routing trace that extends horizontally across the display, as described below. The reflector metal layer 270 including the pixel electrode 209C and the source-drain metal layer 272 may be electrically isolated from the gate metal layer 278; thus, the routing dummy pixel may not have the second via 250 of the dummy pixel 230.

The routing dummy pixel 260 becomes a conductive element of a routing trace 290, such as the routing traces 160, 162 of FIG. 1A, by electrically interconnecting with one or more adjacent routing dummy pixels 260. In some embodiments, an exemplary routing dummy pixel 260A may have adjacent routing dummy pixels including one or more vertically adjacent routing dummy pixels 260B and one or more horizontally adjacent routing dummy pixels 260C. Additionally or alternatively, the routing dummy pixel 260 may have one or more adjacent pixels that are disposed at an angle between horizontal and vertical, with respect to the routing dummy pixel 260. For example, the exemplary routing dummy pixels 260B, 260C are diagonally adjacent to each other and may be interconnected as described herein. A routing dummy pixel may be electrically interconnected with any adjacent routing dummy pixel 260, including in pixel layouts that are not arranged into a matrix of columns and rows in which all pixels are aligned, as illustrated. For example, some pixel layouts position adjacent pixels offset from each other along columns, rows, or both. In such layouts, a routing dummy pixel 260 may be interconnected with another routing dummy pixel that is not directly adjacent. For example, if none of the vertically adjacent routing dummy pixels 260 align in a column with a routing dummy pixel 260, the routing dummy pixel 260 may interconnect with a column-aligned routing dummy pixel 260 in the next row beyond the vertically adjacent row, provided there is sufficient space between the vertically adjacent pixels to form the interconnection. The illustrated routing dummy pixels 260, 260A-C electrically interconnect with corresponding vertically adjacent routing dummy pixels 260 to create the routing trace 290 along one or more columns of pixels. Horizontal interconnections (not illustrated in FIG. 2A) create routing traces along the corresponding row(s) of pixels. A routing dummy pixel 260 may have both horizontal and vertical interconnections.

A conductive interconnect 292 connected - directly, in some embodiments - between two routing dummy pixels 260 forms the electrical interconnection. In some embodiments, the interconnect 292 may be a metal article, such as a conductive trace or a wire, connected to one or more conductive layers, or to one or more conductive elements within one or more conductive layers, in the first routing dummy pixel 260A. The interconnect 292 may further be connected to one or more conductive layers, or to one or more conductive elements within one or more conductive layers, in the second routing dummy pixel 260B. In some embodiments, the connected conductive layer(s) may be in the substrate 205 of a routing dummy pixel 260; exemplary connected conductive layers include the pixel electrode 209C, the reflector metal layer 270, the source-drain metal layer 272, and the gate metal layer 278. In some embodiments, the interconnect 292 may connect directly to the conductive layers of the interconnected routing dummy pixels 260A-B. Additionally or alternatively, the interconnect 292 may connect to the via 274. In other embodiments, a connected conductive layer may be disposed outside of the substrate 205, such as on one or more pixel walls 202 of the routing dummy pixel 260.

In other embodiments, the interconnect 292 may be formed integrally with one or more conductive layers of the first and second routing dummy pixels 260A-B. An exemplary manufacturing method is described below, in which the layers of the substrate 205 of each routing dummy pixel 260 are built up and then etched into desired patterns simultaneously. The deposition and etching processes may form the interconnect 292 into the source-drain metal layers 272, and/or into one or more other layers (e.g., reflector metal layer 270), of the interconnected first and second routing dummy pixels 206A-B. The interconnect 292 may comprise the same source metal as the source-drain metal layers 272. Thus, the source-metal layers 272 of interconnected routing dummy pixels 260 may be in the same layer.

The interconnect 292 may be connected to a routing dummy pixel 260 at any suitable location around the perimeter of the routing dummy pixel 260, and may have a sufficient width and height to conduct an electric current from one routing dummy pixel 260 to the next; the dimensions of the interconnect 292 may determine the resistance of the corresponding routing trace 290. In some embodiments, the minimum width of the interconnect 292 may be determined by limitations of the manufacturing process. For example, in lithographic manufacturing the minimum width may be no less than about four micrometers. The maximum width of the interconnect 292 may be selected to minimize or eliminate any parasitic capacitance between the interconnect 292 and any conductive materials above or below the interconnect 292. For example, in the illustrated configuration the interconnect 292 extends over a gate metal layer forming the gate line 222, and is separated from the gate metal by an insulating layer 223, typically SiN; the width of the interconnect 292 is selected to reduce the parasitic capacitance for the routing trace 290 to a negligible level.

In some embodiments, only a single column and/or row may contain the array of routing dummy pixels 260 that comprise the routing trace 290. In other embodiments, the array of routing dummy pixels 260 may span multiple columns and/or rows, in which the routing dummy pixels 260 of each column/row are serially interconnected and the columns/rows themselves are connected in parallel. Using multiple columns/rows in parallel to conduct the electric current reduces the track resistance of the routing trace 290. In some embodiments, the routing dummy pixels 260 may be interconnected to produce a routing trace 290 with a resistance of one kiloohm or less. In such embodiments, the maximum current flowing in the routing trace 290 may about two milliamps, when the display is operating at a 60 hertz refresh rate, the capacitance of each routing dummy pixel 260 is about 0.6 picofarads, and the maximum voltage swing is about 20 volts. The number of columns and/or rows further can affect the suitable dimensions of the interconnect 292. For example, a routing trace 290 using 16 columns (see example of FIGS. 3A-C) has a corresponding acceptable level of parasitic capacitance, to which each interconnect 292 connected in parallel contributes: where the gate metal layer is about 10 micrometers wide and the insulating layer 223 is about 400 nanometers thick, the width of the interconnect 292 may be between four and ten micrometers, inclusive, to reduce the parasitic capacitance to a negligible level of 15 femtofarads per interconnect 292.

FIG. 2A illustrates an embodiment in which routing dummy pixels 260, 260A-C are disposed next to dummy pixels 230, which in turn are disposed next to active pixels 200. Referring particularly to FIGS. 2B-C, a side view of one of each type is pixel is shown during device operation. A support plate 252 covers the pixels 200, 230, 260, pixel walls 202, and spacers 256 to maintain the fluids within the electrowetting pixel array. A diffuser film 254 may be formed over or, in some cases, integrated into a portion of, support plate 252 to diffuse light striking a surface of support plate 252 and passing therethrough.

In one embodiment, spacers 256 extend to support plate 252 and may rest upon a top surface of one or more pixel walls 202. Multiple spacers 256 may be interspersed throughout the array of pixels. The dimensions and shape of the spacers is 256 not restricted to a pillar shape as shown in FIG. 2B; alternative shapes include crosses, lines of spacers, or full grid spacer structures.

In some embodiments, a front light component may be positioned over an edge of viewing side 200A. In these embodiments, a light guide 258 may be positioned over the support plate 252 to guide light generated by the front light component over viewing side 200A of the device. An outer panel 259, e.g. glass or other material, incorporating various touch-sensitive structures may also be positioned over the device.

At least the active pixels 200 and optionally also dummy pixels 230 and/or routing dummy pixels 260 are associated with a color filter 280. Color filters 280 may be configured to overlay the active pixel 200 entirely. Color filters 280 may be constructed with a generally transparent material such as a photoresist material or photo-definable polymer, including electromagnetic radiation filtering materials suspended within the material. Color filters 280 may be formed by the addition of pigments or dyes to a clear photo-definable polymer, for example. The amount of additive depends on system requirements, such as absorbance or transmission specifications. In some cases, polyacrylates are used as photoresist material. Generally, the organic dyes and pigments used within color filters 280 can have molecular structures containing chromphoric groups generating the color filtering properties. Some examples for chromphoric groups are azo-, anthraquinone-, methine- and phtalocyanine- groups. Color filters 280 may also be formed using a dichromated gelatin doped with a photosynthesizer, dyed polyimides, resins, and the like.

In one embodiment, the display includes a combination of red, blue, green, and white color filters 280, with one color filter 280 being positioned over each pixel 100. Using color filters 280, each active pixel 200 can be associated with a particular wavelength of electromagnetic radiation. By controlling which active pixels 200 are active, the display can generate color images viewable by a user at viewing side 200A. In one embodiment, the red color filters 280 may be transparent to red light having wavelengths ranging from 620 nm to 750 nm, while absorbing light having other wavelengths. A blue color filter 280 may be transparent to blue light having wavelengths ranging from 450 nm to 495 nm, while absorbing light having other wavelengths. A green color filter 280 may be transparent to green light having wavelengths ranging from 495 nm to 570 nm, while absorbing light having other wavelengths. A white color filter 280 may be transparent to all wavelengths of visible light. In other embodiments, different ranges of light wavelengths may be associated with the red, blue and green color filters 280. In still other embodiments, the color filters 280 may be configured to block or transmit electromagnetic radiation of different wavelengths entirely. For example, the device may be configured to generate images using active pixels 200 having color filters 280 configured to transmit electromagnetic radiation of the colors cyan, magenta, and yellow. In short, color filters 280 may be developed and utilized in accordance with any display color model.

Figure 3:
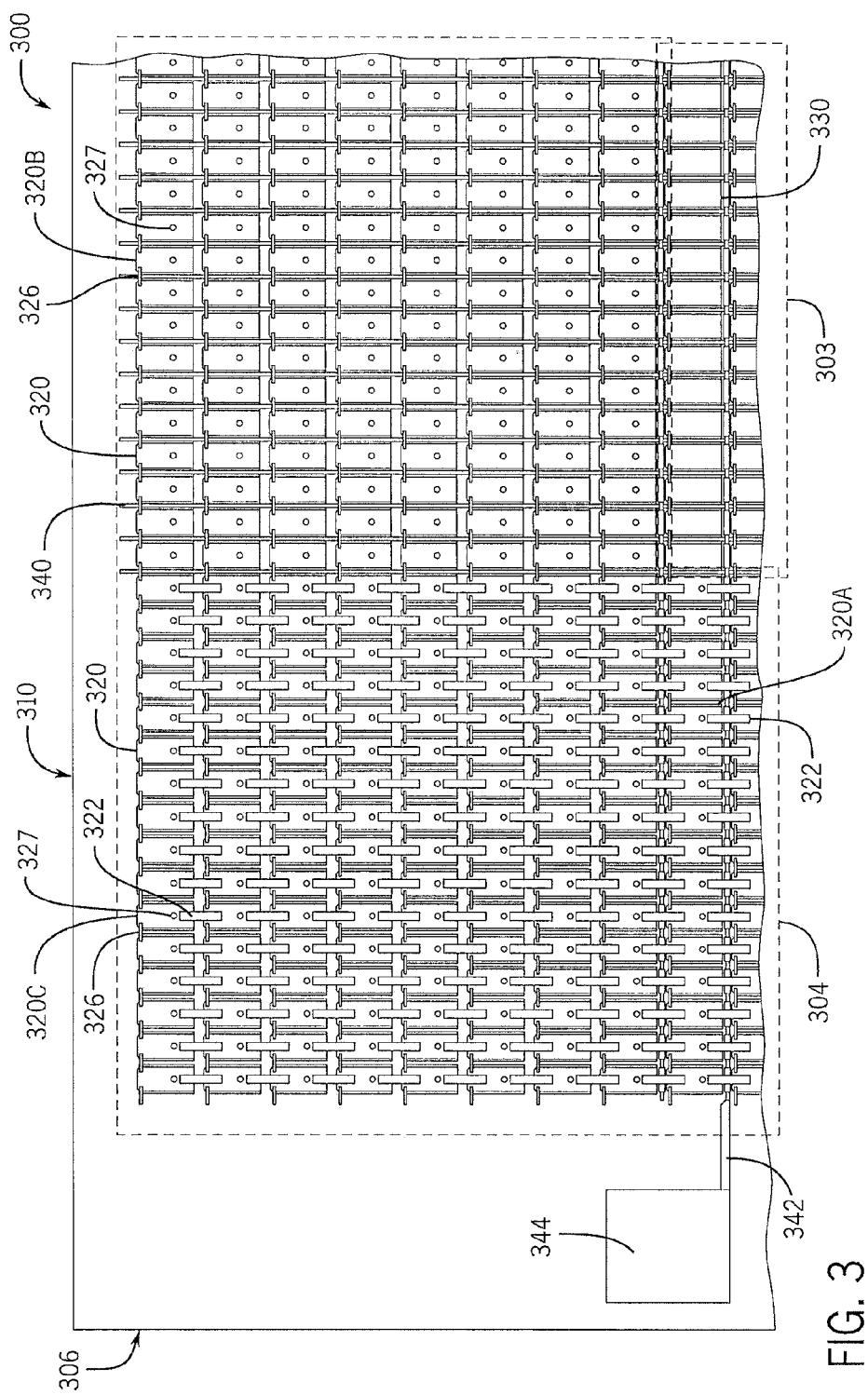
FIG. 3 is a diagram illustrating a plan view of a portion of a panel in an example display.

FIG. 3 illustrates an embodiment of a display panel 300 in which the pixel area includes a border 304 around an active area 303 (which contains the active pixels 330) containing all routing dummy pixels 320 and no dummy pixels. This exemplary embodiment includes sixteen columns of routing dummy pixels 320 along the pixel area approximate the left edge 306 and right edge (not shown) of the panel 300, and eight rows of routing dummy pixels 320 along the pixel area approximate the top edge 310 and bottom edge (not shown) of the panel 300. Source lines 340 are absent between the sixteen columns forming each side of the border 304, and then are disposed through the border 304 along the top and/or bottom in order to address the active pixels 330. Similarly, gate lines 342 are absent between the rows comprising the top and bottom of the border 304, and then are disposed through the sides of the border 304 to address the rows of active pixels 330 (exemplary gate line control circuits 344 are shown).

FIG. 3 illustrates three alternatively structured routing dummy pixels 320 that are used in cooperation to produce a common routing trace that maintains all of the routing dummy pixels 320 of the border 304 at the common voltage. The sides of the border 304, from the top row containing active pixels 330 to the bottom row containing active pixels 330, may comprise first routing dummy pixels 320A configured and vertically interconnected, at the source-drain metal layer by source-drain interconnects 322, as described above with respect to routing dummy pixel 260 of FIG. 2A. In particular, the source-drain metal layer of the first routing dummy pixels 320A may be electrically isolated from the gate metal layer so that the first routing dummy pixels 320A of a particular row may be interconnected at the gate metal layer to form a part of the sub-gate line with the active pixels 330 of the same row.

The top and bottom of the border 304, from the left-most column containing active pixels 330 to the right-most column containing active pixels 330, may comprise second routing dummy pixels 320B that may not be vertically interconnected and/or interconnected at the source-drain metal layer. Vertical interconnects may not be needed, because the common routing trace is to extend horizontally across the panel. Source-drain metal layer interconnects may be undesired, in order to avoid interference with the source lines 340 between columns. A manufacturing efficiency can be achieved using a gate-level interconnect 326, which is a structure containing the gate metal and interconnecting the gate metal layers of horizontally adjacent pixels (e.g., routing dummy pixels 320). While the rows containing active pixels 330 use gate-level interconnects to establish the sub-gate line, the second routing dummy pixels 320B may instead conduct the electrical current that establishes the common voltage through the gate metal layers of horizontally adjacent routing dummy pixels 320B. A via 327 in the second routing dummy pixel 320B may electrically connect the gate metal layer to the source-drain metal layer and the reflector metal layer to establish the common voltage through the entire pixel structure.

The corners of the border 304, where the columns and rows that do not contain active pixels 330 intersect, may comprise one or more of each of the first and second routing dummy pixels 320A, B interconnected with a third routing dummy pixel 320C. Or, the corners may be composed entirely of third routing dummy pixels 320C and may lack first and second routing dummy pixels 320A, B. The third routing dummy pixel 320C is configured to change the direction of the common routing trace, e.g., from vertical to horizontal and/or vice versa. Thus, the third routing dummy pixel 320C may be both vertically and horizontally interconnected with some or all of its adjacent routing dummy pixels, which may include any combination of first, second, and third routing dummy pixels 320A-C.

In some embodiments, vertical interconnections with the third routing dummy pixel 320C may be made using a source-drain interconnect 322 as described above. In other embodiments, the vertical interconnections of a third routing dummy pixel 320C may be made with gate-level interconnects, or with a combination of source-drain and gate-level interconnects. Similarly, horizontal interconnections with the third routing dummy pixel 320C may be made with a gate-level interconnect 326 and/or with a source-drain interconnect (e.g., where a source line 340 does not run between routing dummy pixels 320). In third routing dummy pixels 320C that are interconnected to one adjacent routing dummy pixel at the source-drain metal layer, and to another adjacent routing dummy pixel at the gate metal layer, the third routing dummy pixel 320C may include a via 327 that electrically connects the gate metal layer to the source-drain metal layer and the reflector metal layer to conduct the current between the layers, as well as to establish the common voltage through the entire pixel structure.

The exemplary display panel 300 of FIG. 3 includes, in the border 304: only source-drain level interconnected first routing dummy pixels 320A between the active pixel area 303 and the edge of each "long side" (i.e., left and right edges) of the display panel 300; only gate-level interconnected second routing dummy pixels 320B between the active pixel area and the edge of each "short side" (i.e., top and bottom edges) of the display panel 300; and, at each corner, only third routing dummy pixels 320C, and the third routing dummy pixels 320C are each interconnected at the source-drain level in one direction (i.e., vertical) and at the gate-level in the orthogonal direction (i.e., horizontal), and each have a via 327 connecting the conductive layers. This provides for connectivity of the CoCo pad to the common routing trace at the top of the display panel 300 while minimizing resistance where the common routing trace changes direction, and maintaining the entirety of the border 304 at the common voltage. Many other configurations of routing dummy pixel 320 type and structure may be used to implement a routing trace for a particular display panel.

In some embodiments, the pixel area may include one or more routing dummy pixels 320 that lack one or more pixel walls. In particular, pixel walls that may be disposed around all edges of a standard routing dummy pixel 320 may be removed, or never created, between certain adjacent routing dummy pixels 320. Any fluids, such as the opaque first fluid and conductive second fluid, may move and/or be commingled between adjacent routing dummy pixels 320 that have no wall between them; the commingled fluids may behave in the same manner as the first and second fluids retained in a single routing dummy pixel 320. Such configurations may relieve mechanical stress on the pixel walls and/or on the respective support plates between which the pixels may be disposed. The removal of pixel walls does not change the structure or function of the interconnected routing dummy pixels 320.

In some embodiments, one or more routing traces may extend between edges of the pixel area of the display, as described above. Routing dummy pixels that form each end of the routing trace may be electrically connected, in parallel to each other, to a circuit component of the display. With exemplary reference to FIGS. 1A-C, the routing dummy pixels that comprise a first end of the routing trace 160 may be electrically connected to the electrical connection 106, such as by one or more conductive traces 192 connected to interconnects disposed at the bottom edge of the corresponding routing dummy pixels. Further, the routing dummy pixels that comprise a second end of the routing trace 160 may be electrically connected to the relocated CoCo pad 120 by one or more conductive traces 194 connected to interconnects disposed at the top edge of the corresponding routing dummy pixels. The routing trace 160 and conductive traces 192, 194 may together replace the previous conductive trace(s) 182 that connected the CoCo pad 110 to the electrical connection 106. The electrical connection 106 may thus provide to the CoCo pad 120 the electric current that establishes the common voltage, which may be a grounding voltage for at the support plate 102.

Within the routing trace 160, the electric current is received by a routing dummy pixel through a first interconnect, conducted through the connected conductive layer(s) of the routing dummy pixel and conducted over a second interconnect to the next routing dummy pixel. In some embodiments, the connected conductive layers include the source-drain metal layer and the pixel electrode (or the reflector metal layer containing the pixel electrode), and conducting the electric current through the routing dummy pixel applies the common voltage to the pixel electrode. With the pixel electrode, source-drain metal layer, and CoCo pad 120 at the same voltage, a voltage across the gate metal layer will not activate the routing dummy pixel. Furthermore, no charge can build up on the pixel electrode. The routing dummy pixel thus maintains its black appearance during operation of the display.

In one example manufacturing process, FIGS. 4A-4K illustrate cross-sectional views of a display of the present disclosure, depicting steps in a photolithography process for forming adjacent and interconnected routing dummy pixels. The process includes sequential deposition of stacked layers in a substrate of the pixel, and deposition of pixel walls over the substrate. Deposition techniques include, for example, chemical vapor deposition (CVD), physical vapor deposition (PVD), molecular beam epitaxy (MBE), sputtering, and other techniques described above or known in the art. Between any of the illustrated steps, photoresist material, such as epoxy-based negative photoresist SU-8, may be applied to the exposed layers and the stacked layers may be placed under a mask and exposed to light, to facilitate etching of the layers as is known in the art.

Figure 4A:
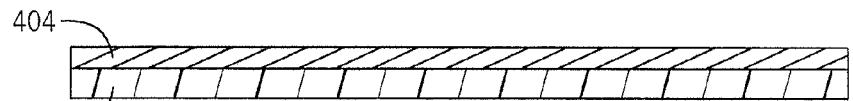
FIGS. 4A-K are cross-sectional views of the formation of routing dummy pixels using an exemplary manufacturing process.
Figure 4B:
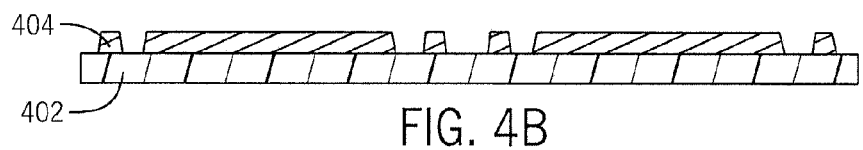

In a first step depicted in FIG. 4A, a gate metal layer 404 is deposited on a support plate 402, which may be any support plate or other panel described above. In one embodiment, the gate metal layer 404 is indium tin oxide (ITO), although in alternative embodiments gate metal layer 404 may be another suitable material. The gate metal layer may then be etched as described above and illustrated in FIG. 4B.

Figure 4C:
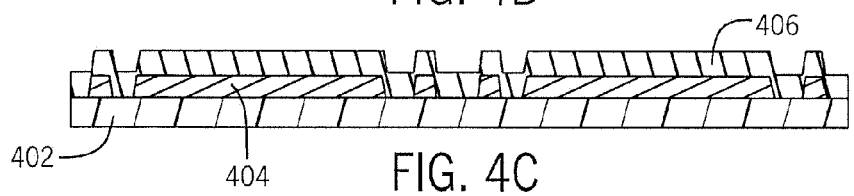
Figure 4D:
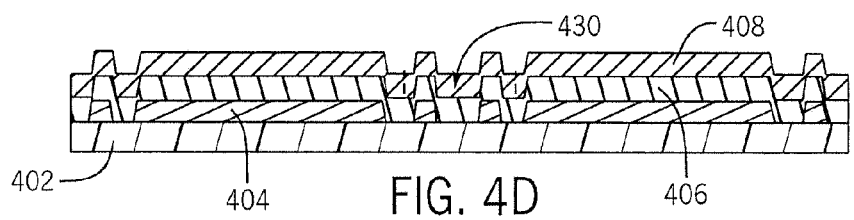
Figure 4E:
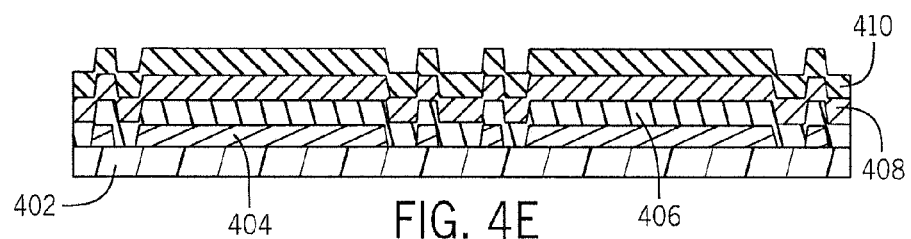
Figure 4F:
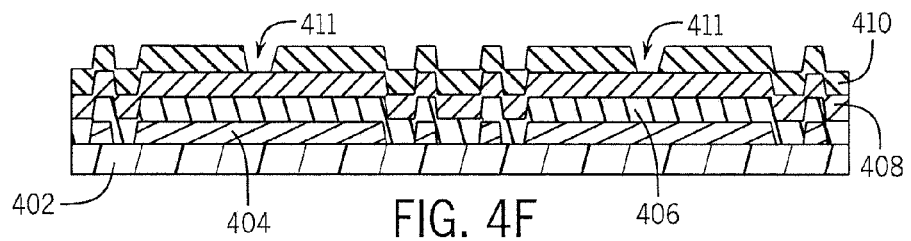

In the next step depicted in FIG. 4C, a first dielectric layer 406 may be deposited on the gate metal layer 404, also contacting the support plate 402 in some embodiments. The first dielectric layer 406 may be the insulating layer 216 of FIG. 2B and may comprise SiN, SiON, SiO, or TaO, for example. Then, as shown in FIG. 4D, a source-drain metal layer 408, which may be the source-drain metal layer 274 of FIG. 2B, is deposited over the first dielectric layer 406 such that the first dielectric layer 406 electrically isolates the source-drain metal layer 408 from the gate metal layer 404. The source-drain metal layer 408 may be a suitable metal or metal alloy such as MoCr or MoTa, and/or may include one or more conductive and/or one or more semiconductive structures and/or materials that define the interconnect 430. As shown in FIG. 4E, a second dielectric layer 410, which may be the insulating layer 211 of FIG. 2B, may then be deposited over the source-drain metal layer 408. The second dielectric layer 410 may then be etched, as described above and shown in FIG. 4F, leaving a hole 411 that exposes the source-gate metal layer 408.

Figure 4G:
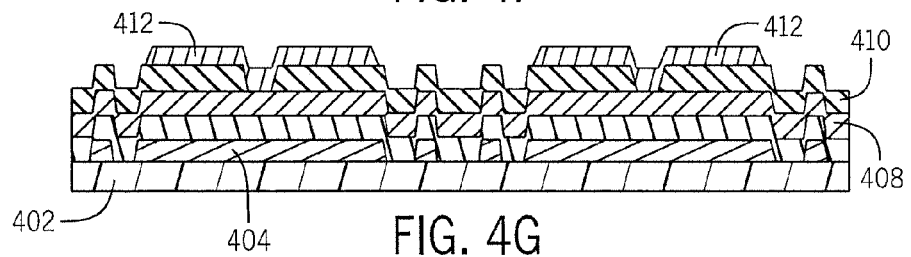
Figure 4H:
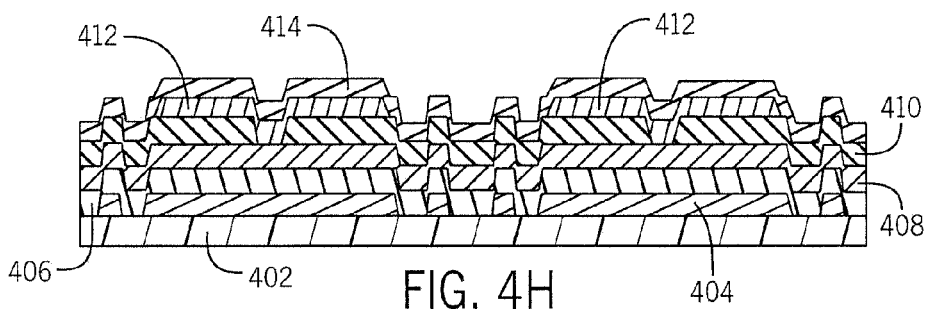
Figure 4I:
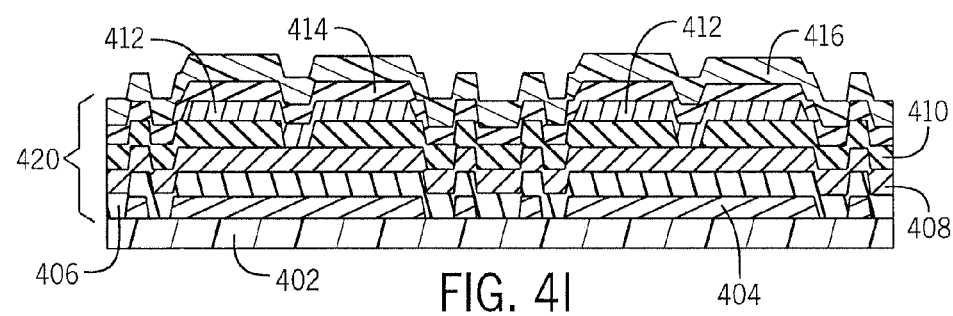

A reflector metal layer 412, which may be the reflector metal layer 270 of FIG. 2B, is then deposited over the second dielectric layer 410 and the source-drain metal layer 408 and then etched as shown in FIG. 4G. The reflector metal layer 412 may include both the pixel electrode and the reflective surface of the routing dummy pixel. The reflector metal layer 412 may fill the hole in the second dielectric layer 410 and contact the source-gate metal layer 408 to create the electrical connection that is, in embodiments described above, facilitated by the conductive via 274 of FIG. 2A. As shown in FIG. 4H, a barrier layer 414 may be disposed over the reflector metal layer 412 and second dielectric layer 410. As shown in FIG. 4I, a hydrophobic layer 416, which may be the hydrophobic layer 208 illustrated in FIG. 2B, may be deposited over the barrier layer 414, completing the substrate 420.

Figure 4J:
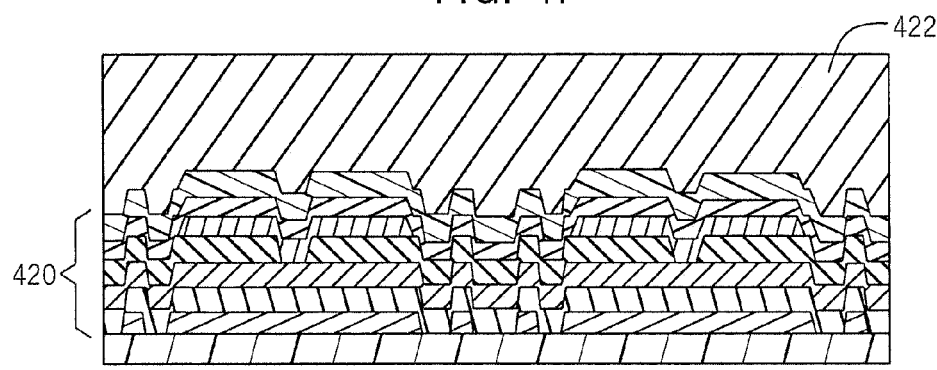
Figure 4K:
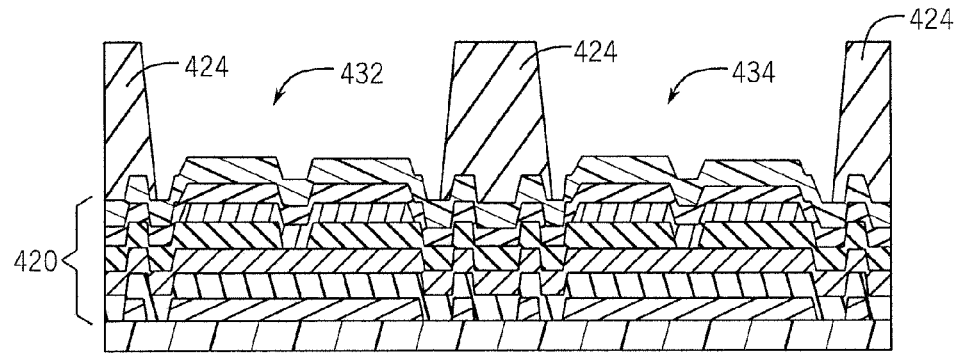

As shown in FIG. 4J, a deposition 422 having a thickness equal to the desired height of the pixel walls may be made over the substrate 420 and then etched, as shown in FIG. 4K, to form the pixel walls 424. In other embodiments, the pixel walls 424 may be formed before the substrate 420 is built. With the pixel walls 424 formed, the first and second fluid can be positioned over the substrate 420 within the pixel walls 424 for each interconnected routing dummy pixel 432, 434, and a second support plate (not shown) can be mounted over the routing dummy pixels and other pixels of the display.

Figure 5:
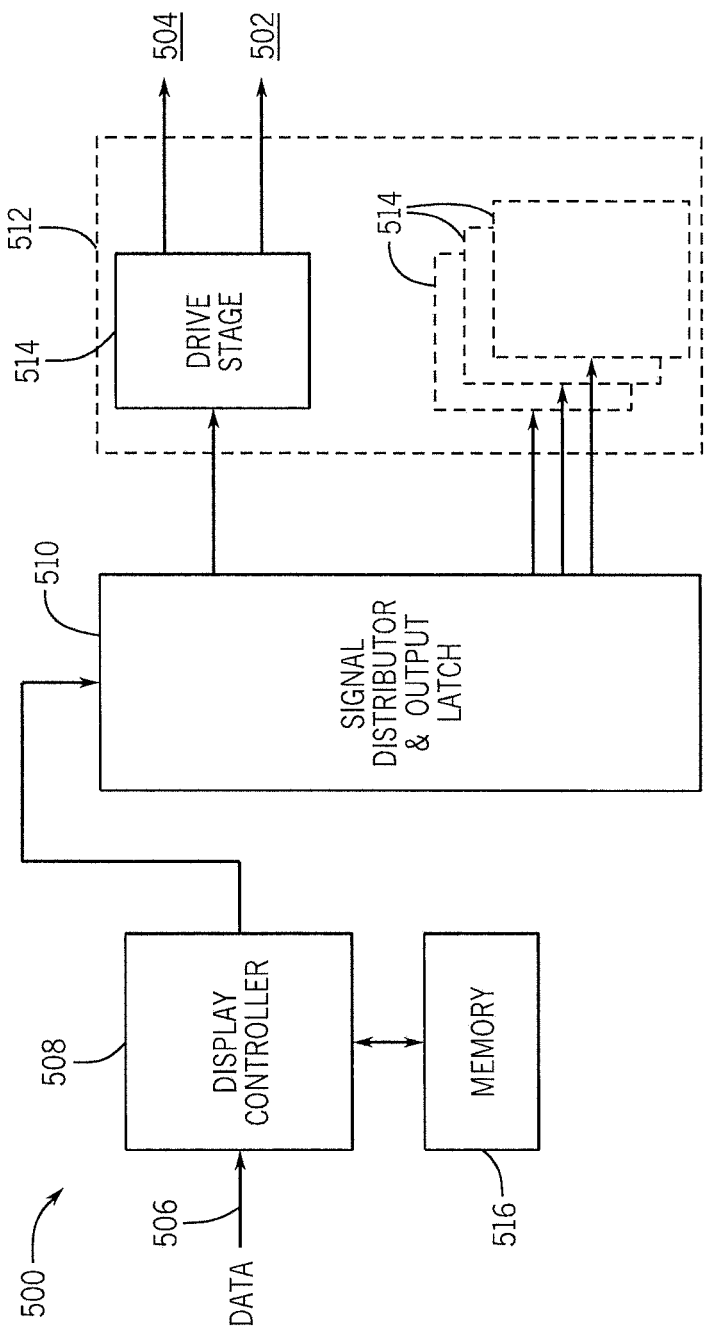
FIG. 5 is a diagram of an exemplary driver system for a pixel matrix in accordance with the present disclosure.

FIG. 5 shows a block diagram of an example embodiment of an electrowetting display driving system 500, including a control system of the display device. Display driving system 500 can be of the so-called direct drive type and may be in the form of an integrated circuit adhered a support plate or other panel. Display driving system 500 includes control logic and switching logic, and is connected to the display by means of electrode signal lines 502 and a common signal line 504. Each electrode signal line 502 connects an output from display driving system 500 to a different electrode within each pixel, respectively. Common signal line 504 may be connected to the second fluid of each pixel through a common electrode, e.g. an electrode deposited over a color filter layer on the top support plate. Also included are one or more input data lines 506, whereby display driving system 500 can be instructed with data so as to determine which active pixels should be in an active or open state and which active pixels should be in an inactive or closed state at any moment of time. In this manner, display driving system 500 can determine a target reflectance value for each pixel within the display.

Electrowetting display driving system 500 as shown in FIG. 5 includes a display controller 508, e.g., a microcontroller, receiving input data from input data lines 506 relating to the image to be displayed. Display controller 508, being in this embodiment the control system, is configured to apply a voltage to the first electrode to establish a particular display state (i.e., reflectance value) for a pixel. The display controller 508 controls a timing and/or a level (i.e., voltage) of at least one signal for a pixel.

The output of display controller 508 is connected to the data input of a signal distributor and data output latch 510. Signal distributor and data output latch 510 distributes incoming data over a plurality of outputs connected to the display device, via drivers in certain embodiments. Signal distributor and data output latch 510 cause data input indicating that a certain pixel is to be set in a specific display state to be sent to the output connected to pixel. Signal distributor and data output latch 510 may be a shift register. The input data is clocked into the shift register and at receipt of a latch pulse the content of the shift register is copied to signal distributor and data output latch 510. Signal distributor and data output latch 510 has one or more outputs, connected to a driver assembly 512. The outputs of signal distributor and data output latch 510 are connected to the inputs of one or more driver stages 514 within electrowetting display driving system 500. The outputs of each driver stage 514 are connected through electrode signal lines 502 and common signal line 504 to a corresponding pixel. In response to the input data, a driver stage 514 will output a voltage of the signal level set by display controller 508 to set one of the pixels to a corresponding display state having a target reflectance level.

To assist in setting a particular pixel to a target reflectance level, memory 516 may also store data that maps a particular driving voltage for a pixel to a corresponding reflectance value and vice versa. The data may be stored as one or more curves depicting the relationship between driving voltage and reflectance value, or a number of discrete data points that map a driving voltage to a reflectance value and vice versa. As such, when display controller 508 identifies a target reflectance value for a particular pixel, display controller 508 can use the data mapping driving voltage to reflectance value to identify a corresponding driving voltage. The pixel can then be driven with that driving voltage.

Figure 6:
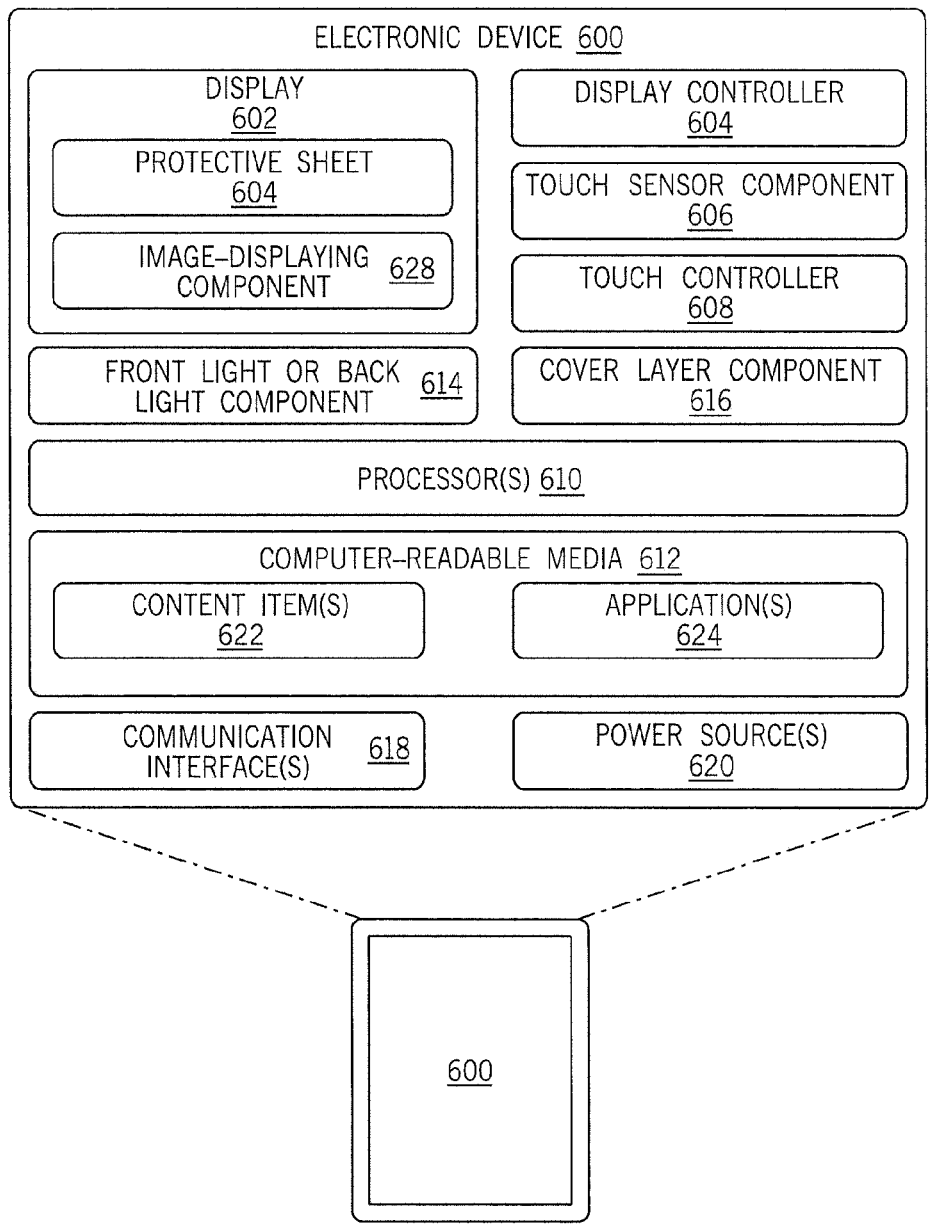
FIG. 6 is a diagram of an example electronic device that may incorporate a display device, according to various embodiments.

FIG. 6 illustrates an example electronic device 600 that may incorporate any of the display devices discussed above. Electronic device 600 may comprise any type of electronic device having a display. For instance, electronic device 600 may be a mobile electronic device (e.g., an electronic book reader, a tablet computing device, a laptop computer, a smart phone or other multifunction communication device, a portable digital assistant, a wearable computing device, or an automotive display). Alternatively, electronic device 600 may be a non-mobile electronic device (e.g., a computer display or a television). In addition, while FIG. 6 illustrates several example components of electronic device 600, it is to be appreciated that electronic device 600 may also include other conventional components, such as an operating system, system busses, input/output components, and the like. Further, in other embodiments, such as in the case of a television or computer monitor, electronic device 600 may only include a subset of the components illustrated.

Regardless of the specific implementation of electronic device 600, electronic device 600 includes a display 602 and a corresponding display controller 604. The display 602 may represent a reflective or transmissive display in some instances or, alternatively, a transflective display (partially transmissive and partially reflective).

In one embodiment, display 602 comprises an electrowetting display that employs an applied voltage to change the surface tension of a fluid in relation to a surface. For example, such an electrowetting display may include the arrays or other groups of pixels 200, 230, 260 illustrated in FIG. 2A, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user.

On the other hand, if the voltage is applied to the pixel, the colored oil is displaced and the pixel becomes transparent. If multiple pixels of the display are independently activated, display 602 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "white" value of the pixel may correspond to a brightest red of the color filter. Furthermore, while some examples herein are described in the environment of a reflective display, in other examples, display 602 may represent a backlit display, examples of which are mentioned above.

In addition to including display 602, FIG. 6 illustrates that some examples of electronic device 600 may include a touch sensor component 606 and a touch controller 608. In some instances, at least one touch sensor component 606 resides with, or is stacked on, display 602 to form a touch-sensitive display. Thus, display 602 may be capable of both accepting user touch input and rendering content in response to or corresponding to the touch input. As several examples, touch sensor component 606 may comprise a capacitive touch sensor, a force sensitive resistance (FSR), an interpolating force sensitive resistance (IFSR) sensor, or any other type of touch sensor. In some instances, touch sensor component 606 is capable of detecting touches as well as determining an amount of pressure or force of these touches.

FIG. 6 further illustrates that electronic device 600 may include one or more processors 610 and one or more computer-readable media 612, as well as a front light component 614 (which may alternatively be a backlight component in the case of a backlit display) for lighting display 602, a cover layer component 616, such as a cover glass or cover sheet, one or more communication interfaces 618 and one or more power sources 620. The communication interfaces 618 may support both wired and wireless connection to various networks, such as cellular networks, radio, WiFi networks, short range networks (e.g., Bluetooth® technology), and infrared (IR) networks, for example.

Depending on the configuration of electronic device 600, computer-readable media 612 (and other computer-readable media described throughout) is an example of computer storage media and may include volatile and nonvolatile memory. Thus, computer-readable media 612 may include, without limitation, RAM, ROM, EEPROM, flash memory, and/or other memory technology, and/or any other suitable medium that may be used to store computer-readable instructions, programs, applications, media items, and/or data which may be accessed by electronic device 600.

Computer-readable media 612 may be used to store any number of functional components that are executable on processor 610, as well as content items 622 and applications 624. Thus, computer-readable media 612 may include an operating system and a storage database to store one or more content items 622, such as eBooks, audio books, songs, videos, still images, and the like. Computer-readable media 612 of electronic device 600 may also store one or more content presentation applications to render content items on electronic device 600. These content presentation applications may be implemented as various applications 624 depending upon content items 622. For instance, the content presentation application may be an electronic book reader application for rending textual electronic books, an audio player for playing audio books or songs, or a video player for playing video.

In some instances, electronic device 600 may couple to a cover (not illustrated in FIG. 6) to protect the display 602 (and other components in the display stack or display assembly) of electronic device 600. In one example, the cover may include a back flap that covers a back portion of electronic device 600 and a front flap that covers display 602 and the other components in the stack. Electronic device 600 and/or the cover may include a sensor (e.g., a Hall effect sensor) to detect whether the cover is open (i.e., if the front flap is not atop display 602 and other components). The sensor may send a signal to front light component 614 if the cover is open and, in response, front light component 614 may illuminate display 602. If the cover is closed, meanwhile, front light component 614 may receive a signal indicating that the cover has closed and, in response, front light component 614 may turn off.

Furthermore, the amount of light emitted by front light component 614 may vary. For instance, upon a user opening the cover, the light from the front light may gradually increase to its full illumination. In some instances, electronic device 600 includes an ambient light sensor (not illustrated in FIG. 6) and the amount of illumination of front light component 614 may be based at least in part on the amount of ambient light detected by the ambient light sensor. For example, front light component 614 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 602 may vary depending on whether front light component 614 is on or off, or based on the amount of light provided by front light component 614. For instance, electronic device 600 may implement a larger default font or a greater contrast when the light is off compared to when the light is on. In some embodiments, electronic device 600 maintains, if the light is on, a contrast ratio for display 602 that is within a certain defined percentage of the contrast ratio if the light is off.

As described above, touch sensor component 606 may comprise a capacitive touch sensor that resides atop display 602. In some examples, touch sensor component 606 may be formed on or integrated with cover layer component 616. In other examples, touch sensor component 606 may be a separate component in the stack of the display assembly. Front light component 614 may reside atop or below touch sensor component 606. In some instances, either touch sensor component 606 or front light component 614 is coupled to a top surface of a protective sheet 626 of display 602. As one example, front light component 614 may include a lightguide sheet and a light source (not illustrated in FIG. 6). The lightguide sheet may comprise a substrate (e.g., a transparent thermoplastic such as PMMA or other acrylic), a layer of lacquer and multiple grating elements formed in the layer of lacquer that function to propagate light from the light source towards display 602; thus, illuminating display 602.

Cover layer component 616 may include a transparent substrate or sheet having an outer layer that functions to reduce at least one of glare or reflection of ambient light incident on electronic device 600. In some instances, cover layer component 616 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, protective sheet 626 may include a similar UV-cured hard coating on the outer surface. Cover layer component 616 may couple to another component or to protective sheet 626 of display 602. Cover layer component 616 may, in some instances, also include a UV filter, a UV-absorbing dye, or the like, for protecting components lower in the stack from UV light incident on electronic device 600. In still other examples, cover layer component 616 may include a sheet of high-strength glass having an antiglare and/or antireflective coating.

Display 602 includes protective sheet 626 overlying an image-displaying component 628. For example, display 602 may be preassembled to have protective sheet 626 as an outer surface on the upper or image-viewing side of display 602. Accordingly, protective sheet 626 may be integral with and may overlay image-displaying component 628. Protective sheet 626 may be optically transparent to enable a user to view, through protective sheet 626, an image presented on image-displaying component 628 of display 602.

In some examples, protective sheet 626 may be a transparent polymer film in the range of 25 to 200 micrometers in thickness. As several examples, protective sheet 626 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 626 may include a coating, such as the hard coating described above. For instance, the hard coating may be applied to the outer surface of protective sheet 626 before or after assembly of protective sheet 626 with image-displaying component 628 of display 602. In some examples, the hard coating may include a photoinitiator or other reactive species in its composition, such as for curing the hard coating on protective sheet 626. Furthermore, in some examples, protective sheet 626 may be dyed with a UV-light-absorbing dye, or may be treated with other UV-absorbing treatment. For example, protective sheet 626 may be treated to have a specified UV cutoff such that UV light below a cutoff or threshold wavelength is at least partially absorbed by protective sheet 626, thereby protecting image-displaying component 628 from UV light.

According to some embodiments herein, one or more of the components discussed above may be coupled to display 602 using fluid optically-clear adhesive (LOCA). For example, the lightguide portion of front light component 614 may be coupled to display 602 by placing LOCA on the outer or upper surface of protective sheet 626. If the LOCA reaches the corner(s) and/or at least a portion of the perimeter of protective sheet 626, UV-curing may be performed on the LOCA at the corners and/or the portion of the perimeter. Thereafter, the remaining LOCA may be UV-cured and front light component 614 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 614. In other embodiments, the LOCA may be placed near a center of protective sheet 626, and pressed outwards towards a perimeter of the top surface of protective sheet 626 by placing front light component 614 on top of the LOCA. The LOCA may then be cured by directing UV light through front light component 614. As discussed above, and as discussed additionally below, various techniques, such as surface treatment of the protective sheet, may be used to prevent discoloration of the LOCA and/or protective sheet 626.

While FIG. 6 illustrates a few example components, electronic device 600 may have additional features or functionality. For example, electronic device 600 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 600 may reside remotely from electronic device 600 in some implementations. In these implementations, electronic device 600 may utilize communication interfaces 618 to communicate with and utilize this functionality.

In some embodiments, the present disclosure provides an electrowetting display for a computing device. The electrowetting display includes: a panel having a top edge, a left edge, a bottom edge, and a right edge; a plurality of pixels disposed between the top edge and the bottom edge of the panel and between the left edge and the right edge of the panel, and arranged into a plurality of columns and a plurality of rows, a top row of the plurality of rows being a first distance from the top edge of the panel, and a bottom row of the plurality of rows being a second distance from the bottom edge of the panel; a first common connector pad connected to the panel to provide a common voltage to the panel, the first common connector pad disposed a third distance from the top edge of the panel, the third distance being less than the first distance; an electrical connector disposed a fourth distance from the bottom edge of the panel, the fourth distance being less than the second distance, and the electrical connector electrically connected to a power supply; and, a conductive first trace electrically connected to the electrical connector and to the first common connector pad, and conducting an electric current from the electrical connector to the first common connector pad. The first trace includes: a first pixel of the plurality of pixels, the first pixel disposed in a first column of the plurality of columns and comprising a first substrate that includes a first source-drain metal layer, a first reflector metal layer, a first via electrically connecting the first source-drain metal layer to the first reflector metal layer, and a first gate metal layer electrically isolated from the first source-drain metal layer and the first reflector metal layer; a second pixel of the plurality of pixels, the second pixel disposed in the first column and adjacent to the first pixel, the second pixel comprising a second substrate that includes a second source-drain metal layer, a second reflector metal layer, a second via electrically connecting the second source-drain metal layer to the second reflector metal layer, and a second gate metal layer electrically isolated from the second source-drain metal layer and the second reflector metal layer; and, a first interconnect electrically connecting the first source-drain metal layer and the second source-drain metal layer in series to conduct at least a first portion of the electric current within the first column.

In such an electrowetting display, the plurality of pixels may further include a plurality of active pixels that cooperate to produce an image on the electrowetting display, the plurality of active pixels disposed within an active area. The first column and a second column of the plurality of columns may be disposed outside of the active area. The electrowetting display may further include: a second common connector pad connected to the panel to provide the common voltage to the panel in cooperation with the first common connector pad, the second common connector pad disposed the third distance from the top edge of the panel; and, a conductive second trace electrically connected to the electrical connector and to the second common conductor pad, the second trace conducting the electric current from the electrical connector to the second common connector pad. The second trace may include: a third pixel of the plurality of pixels, the third pixel disposed in the second column and comprising a third substrate that includes a third source-drain metal layer, a third reflector metal layer, a third via electrically connecting the third source-drain metal layer to the third reflector metal layer, and a third gate metal layer electrically isolated from the third source-drain metal layer and the third reflector metal layer; a fourth pixel of the plurality of pixels, the fourth pixel disposed in the second column and adjacent to the third pixel, the fourth pixel comprising a fourth substrate that includes a fourth source-drain metal layer, a fourth reflector metal layer, a fourth via electrically connecting the fourth source-drain metal layer to the fourth reflector metal layer, and a fourth gate metal layer electrically isolated from the fourth source-drain metal layer and the fourth reflector metal layer; and, a second interconnect electrically connecting the third source-drain metal layer and the fourth source-drain metal layer in series to conduct at least a second portion of the electric current within the second column.

Furthermore, the first reflector metal layer may reflect light incident on the first reflector metal layer, and the first pixel may further include a light-absorbing fluid that is disposed over the first substrate and obscures the first reflector metal layer to make the first pixel appear black; conduction of the electric current across the first source-drain metal layer does not move the light-absorbing fluid to expose the first reflector metal layer to the light. The first trace may further include: a third pixel of the plurality of pixels, the third pixel disposed in a second column of the plurality of columns and comprising a third substrate that includes a third source-drain metal layer, a third reflector metal layer, a third via electrically connecting the third source-drain metal layer to the third reflector metal layer, and a third gate metal layer electrically isolated from the third source-drain metal layer and the third reflector metal layer; a fourth pixel of the plurality of pixels, the fourth pixel disposed in the second column and adjacent to the third pixel, the fourth pixel comprising a fourth substrate that includes a fourth source-drain metal layer, a fourth reflector metal layer, a fourth via electrically connecting the fourth source-drain metal layer to the fourth reflector metal layer, and a fourth gate metal layer electrically isolated from the fourth source-drain metal layer and the fourth reflector metal layer; and, a second interconnect electrically connecting the third source-drain layer and the fourth source-drain layer in series, and in parallel with the first pixel and the second pixel, to conduct a second portion of the electric current within the second column.

In other embodiments, the present disclosure provides an apparatus having a pixel area including a plurality of active pixels that cooperate to display an image. A first pixel within the pixel area includes a first substrate having a first gate metal layer and a first source-drain metal layer electrically isolated from the first gate metal layer. A second pixel within the pixel area includes a second substrate having a second gate metal layer and a second source-drain metal layer electrically isolated from the second gate metal layer. A first interconnect electrically connects the first source-drain metal layer to the second source-drain metal layer in series. The first pixel may remain in an off state, in which the first pixel appears black, while the image is displayed.

In such embodiments, the first substrate may further include a first reflector metal layer electrically connected to the first source-drain metal layer and electrically isolated from the first gate metal layer. The first pixel may further include a fluid layer disposed above the first substrate and comprising a light-absorbing fluid that absorbs light incident on the first pixel and, responsive to an electric current being conducted across the first pixel, obscures the first reflector metal layer to make the first pixel appear black.

Furthermore, the first pixel and the second pixel may be arranged adjacently in a first column, and the first pixel may be electrically connected at the first source-drain metal layer to a power supply that provides an electric current. The apparatus may further include: a third pixel disposed in a second column within the pixel area and including a third substrate having a third gate metal layer and a third source-drain metal layer electrically isolated from the third gate metal layer and electrically connected to the power supply in parallel with the first pixel; a fourth pixel disposed in the second column and adjacent to the third pixel, the fourth pixel including a fourth substrate having a fourth gate metal layer and a fourth source-drain metal layer electrically isolated from the fourth gate metal layer; and, a second interconnect electrically connecting the third source-drain metal layer to the fourth source-drain metal layer in series. The apparatus may further include a first trace that includes the first pixel, second pixel, third pixel, and fourth pixel, and conducts the electric current from a first end of the first trace, the first end including the first pixel and the third pixel and disposed at a first edge of the pixel area, through the pixel area to a second end of the first trace, the second end disposed at a second edge of the pixel area.

Otherwise, the apparatus may include: a third pixel disposed within the pixel area and including a third substrate having a third gate metal layer and a third source-drain metal layer electrically connected to the third gate metal layer; and, a second interconnect electrically connecting the second source-drain metal layer to the third source-drain metal layer in series. A fourth pixel disposed in the pixel area may include a fourth substrate having a fourth gate metal layer and a fourth source-drain metal layer electrically connected to the fourth gate metal layer. A third interconnect may electrically connect the third gate metal layer to the fourth gate metal layer in series, wherein an electric current applied to the first pixel at the first source-drain metal layer is conducted through the first pixel, across the first interconnect, through the second pixel at the second source-drain metal layer, across the second interconnect, through the third pixel from the third source-drain metal layer to the third gate metal layer, and across the third interconnect to the fourth pixel at the fourth gate metal layer. Or, a fourth pixel disposed in the pixel area may include a fourth substrate having a fourth gate metal layer and a fourth source-drain metal layer disposed above at least a portion of the fourth gate metal layer, and a third interconnect may electrically connect the third source-drain metal layer to the fourth source-drain metal layer in series.

In such embodiments, the first interconnect may be disposed over a conductive gate line having a first width. The first interconnect may be separated from the gate line by an insulating layer, and the first interconnect may have a second width that is proportional to a parasitic capacitance between the gate line and the first interconnect. The second width may enable the first interconnect to, responsive to an electric current being applied to the first source-drain metal layer, conduct the electric current from the first source-drain metal layer to the second source-drain metal layer, wherein a highest value of the parasitic capacitance does not interfere with operations of the apparatus.

In still other embodiments, the present disclosure provides a display for a computing device, the display including: a panel having a first edge, a second edge adjacent to the first edge, a third edge adjacent to the second edge and opposite the first edge, and a fourth edge adjacent to the third edge and the first edge and opposite the second edge, the first, second, third, and fourth edges defining a perimeter of the panel; and, a plurality of pixels disposed within the perimeter of the panel. The plurality of pixels includes a first array of pixels electrically interconnected to form a first trace that conducts an electric current from a first end of the first trace through the first array of pixels to a second end of the first trace. The display may further include a plurality of active pixels that define an active area and cooperate to produce an image on the display, wherein the plurality of pixels do not produce the image and form a border around the active area, the border including the first array.

In such embodiments, the display may further include: a contact ledge disposed at the first edge of the panel; an electrical connector disposed on the contact ledge and electrically connected to a power supply and to a first pixel of the first array; and a first common connector pad connected to the panel, at a first distance away from the contact ledge, to provide a common voltage to the panel, the first common connector pad electrically connected to a second pixel of the first array to receive the electrical current from the electrical connector through the first trace. The plurality of pixels may further include a second array of pixels electrically interconnected to form a second trace that conducts an electric current from a first end of the second trace through the second array of pixels to a second end of the second trace, the first end of the second trace being electrically connected to the electrical connector. The display may further include a second common connector pad connected to the panel, at a second distance away from the contact ledge, to provide the common voltage to the panel in cooperation with the first common connector pad, the second common connector pad electrically connected to the second end of the second trace to receive the electrical current from the electrical connector through the second trace.

Furthermore, the plurality of pixels may include a plurality of pixel arrays including the first array, each pixel array including a corresponding plurality of routing pixels electrically interconnected in series to conduct at least a portion of the electric current, the plurality of pixel arrays being electrically connected in parallel to form the first trace. The display may further include a gate metal layer deposited on the panel and etched into a plurality of electrically isolated portions each associated with a corresponding pixel of the first array of pixels, an insulating layer deposited on the panel over the gate metal layer, and a source-drain metal layer deposited on the panel over the gate metal layer and the insulating layer and etched into a plurality of electrically interconnected portions each associated with a corresponding pixel of the first array of pixels.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display for a computing device, the electrowetting display comprising:
    a panel having a top edge, a left edge, a bottom edge, and a right edge;
    a plurality of pixels disposed between the top edge and the bottom edge of the panel and between the left edge and the right edge of the panel, and arranged into a plurality of columns and a plurality of rows, a top row of the plurality of rows being a first distance from the top edge of the panel, and a bottom row of the plurality of rows being a second distance from the bottom edge of the panel;

a first common connector pad connected to the panel to provide a common voltage to the panel, the first common connector pad disposed a third distance from the top edge of the panel, the third distance being less than the first distance;

an electrical connector disposed a fourth distance from the bottom edge of the panel, the fourth distance being less than the second distance, and the electrical connector electrically connected to a power supply; and a conductive first trace electrically connected to the electrical connector and to the first common connector pad, and conducting an electric current from the electrical connector to the first common connector pad, the first trace comprising:

a first pixel of the plurality of pixels, the first pixel disposed in a first column of the plurality of columns and comprising a first substrate that includes a first source-drain metal layer, a first reflector metal layer, a first via electrically connecting the first source-drain metal layer to the first reflector metal layer, and a first gate metal layer electrically isolated from the first source-drain metal layer and the first reflector metal layer;

a second pixel of the plurality of pixels, the second pixel disposed in the first column and adjacent to the first pixel, the second pixel comprising a second substrate that includes a second source-drain metal layer, a second reflector metal layer, a second via electrically connecting the second source-drain metal layer to the second reflector metal layer, and a second gate metal layer electrically isolated from the second source-drain metal layer and the second reflector metal layer; and a first interconnect electrically connecting the first source-drain metal layer and the second source-drain metal layer in series to conduct at least a first portion of the electric current within the first column.

2. The electrowetting display of claim 1, wherein:

the plurality of pixels further includes a plurality of active pixels that cooperate to produce an image on the electrowetting display, the plurality of active pixels disposed within an active area;

the first column and a second column of the plurality of columns are disposed outside of the active area; and the electrowetting display further comprises:

a second common connector pad connected to the panel to provide the common voltage to the panel in cooperation with the first common connector pad, the second common connector pad disposed the third distance from the top edge of the panel; and a conductive second trace electrically connected to the electrical connector and to the second common conductor pad, the second trace conducting the electric current from the electrical connector to the second common connector pad, and the second trace comprising:

a third pixel of the plurality of pixels, the third pixel disposed in the second column and comprising a third substrate that includes a third source-drain metal layer, a third reflector metal layer, a third via electrically connecting the third source-drain metal layer to the third reflector metal layer, and a third gate metal layer electrically isolated from the third source-drain metal layer and the third reflector metal layer;

a fourth pixel of the plurality of pixels, the fourth pixel disposed in the second column and adjacent to the third pixel, the fourth pixel comprising a fourth substrate that includes a fourth source-drain metal layer, a fourth reflector metal layer, a fourth via electrically connecting the fourth source-drain metal layer to the fourth reflector metal layer, and a fourth gate metal layer electrically isolated from the fourth source-drain metal layer and the fourth reflector metal layer; and a second interconnect electrically connecting the third source-drain metal layer and the fourth source-drain metal layer in series to conduct at least a second portion of the electric current within the second column.

3. The electrowetting display of claim 1, wherein the first reflector metal layer reflects light incident on the first reflector metal layer, the first pixel further comprising a light-absorbing fluid that is disposed over the first substrate and obscures the first reflector metal layer to make the first pixel appear black, wherein conduction of the electric current across the first source-drain metal layer does not move the light-absorbing fluid to expose the first reflector metal layer to the light.

4. The electrowetting display of claim 1, wherein the first trace further comprises:

a third pixel of the plurality of pixels, the third pixel disposed in a second column of the plurality of columns and comprising a third substrate that includes a third source-drain metal layer, a third reflector metal layer, a third via electrically connecting the third source-drain metal layer to the third reflector metal layer, and a third gate metal layer electrically isolated from the third source-drain metal layer and the third reflector metal layer;

a fourth pixel of the plurality of pixels, the fourth pixel disposed in the second column and adjacent to the third pixel, the fourth pixel comprising a fourth substrate that includes a fourth source-drain metal layer, a fourth reflector metal layer, a fourth via electrically connecting the fourth source-drain metal layer to the fourth reflector metal layer, and a fourth gate metal layer electrically isolated from the fourth source-drain metal layer and the fourth reflector metal layer; and a second interconnect electrically connecting the third source-drain layer and the fourth source-drain layer in series, and in parallel with the first pixel and the second pixel, to conduct a second portion of the electric current within the second column.

5. An apparatus comprising:

a pixel area including a plurality of active pixels that cooperate to display an image;

a first pixel within the pixel area and comprising a first substrate having:
  a first gate metal layer; and
  a first source-drain metal layer electrically isolated from the first gate metal layer;

a second pixel within the pixel area and comprising a second substrate having:
  a second gate metal layer; and
  a second source-drain metal layer electrically isolated from the second gate metal layer; and a first interconnect electrically connecting the first source-drain metal layer to the second source-drain metal layer in series, wherein an electric current applied at the first source-drain metal layer of the first pixel is conducted from the first source-drain metal layer to the second source-drain metal layer of the second pixel through the first interconnect.

6. The apparatus of claim 5, wherein the first pixel remains in an off state, in which the first pixel appears black, while the image is displayed.

7. The apparatus of claim 5, wherein the first substrate further includes a first reflector metal layer electrically connected to the first source-drain metal layer and electrically isolated from the first gate metal layer.

8. The apparatus of claim 7, wherein the first pixel further comprises a fluid layer disposed above the first substrate, the fluid layer comprising a light- absorbing fluid that absorbs light incident on the first pixel and, responsive to the electric current being conducted across the first pixel, obscures the first reflector metal layer to make the first pixel appear black.

9. The apparatus of claim 5, wherein the first pixel and the second pixel are arranged adjacently in a first column and the first pixel is electrically connected at the first source-drain metal layer to a power supply that provides the electric current, the apparatus further comprising:
a third pixel disposed in a second column within the pixel area, the third pixel comprising a third substrate having:
a third gate metal layer; and
a third source-drain metal layer electrically isolated from the third gate metal layer and electrically connected to the power supply in parallel with the first pixel;
a fourth pixel disposed in the second column and adjacent to the third pixel, the fourth pixel comprising a fourth substrate having:
a fourth gate metal layer; and
a fourth source-drain metal layer electrically isolated from the fourth gate metal layer; and
a second interconnect electrically connecting the third source-drain metal layer to the fourth source-drain metal layer in series.

10. The apparatus of claim 9, further comprising a first trace including the first pixel, second pixel, third pixel, and fourth pixel and conducting the electric current from a first end of the first trace, the first end including the first pixel and the third pixel and disposed at a first edge of the pixel area, through the pixel area to a second end of the first trace, the second end disposed at a second edge of the pixel area.

11. The apparatus of claim 5, further comprising:
a third pixel disposed within the pixel area, the third pixel comprising a third substrate having:
a third gate metal layer; and
a third source-drain metal layer electrically connected to the third gate metal layer; and
a second interconnect electrically connecting the second source-drain metal layer to the third source-drain metal layer in series.

12. The apparatus of claim 11, further comprising:
a fourth pixel disposed in the pixel area and comprising a fourth substrate having:
a fourth gate metal layer; and
a fourth source-drain metal layer electrically connected to the fourth gate metal layer; and
a third interconnect electrically connecting the third gate metal layer to the fourth gate metal layer in series, wherein the electric current is applied to the first pixel at the first source-drain metal layer and is conducted through the first pixel, across the first interconnect, through the second pixel at the second source-drain metal layer, across the second interconnect, through the third pixel from the third source-drain metal layer to the third gate metal layer, and across the third interconnect to the fourth pixel at the fourth gate metal layer.

13. The apparatus of claim 11, further comprising:
a fourth pixel disposed in the pixel area and comprising a fourth substrate having:
a fourth gate metal layer; and
a fourth source-drain metal layer disposed above at least a portion of the fourth gate metal layer; and
a third interconnect electrically connecting the third source-drain metal layer to the fourth source-drain metal layer in series.

14. The apparatus of claim 5, wherein the first interconnect is disposed over a conductive gate line having a first width, the first interconnect is separated from the gate line by an insulating layer, and the first interconnect has a second width that is proportional to a parasitic capacitance between the gate line and the first interconnect;
the second width enabling the first interconnect to, responsive to the electric current being applied to the first source-drain metal layer, conduct the electric current from the first source-drain metal layer to the second source-drain metal layer, wherein a highest value of the parasitic capacitance does not interfere with operations of the apparatus.

15. A display for a computing device, the display comprising:
a panel having a first edge, a second edge adjacent to the first edge, a third edge adjacent to the second edge and opposite the first edge, and a fourth edge adjacent to the third edge and the first edge and opposite the second edge, the first, second, third, and fourth edges defining a perimeter of the panel; and
a plurality of pixels disposed within the perimeter of the panel;
the plurality of pixels including a first array of pixels electrically interconnected to form a first trace that conducts an electric current from a first end of the first trace through the first array of pixels to a second end of the first trace.

16. The display of claim 15, further comprising a plurality of active pixels that define an active area and cooperate to produce an image on the display;
wherein the plurality of pixels do not produce the image and form a border around the active area, the border including the first array.

17. The display of claim 15, further comprising:
a contact ledge disposed at the first edge of the panel;
an electrical connector disposed on the contact ledge and electrically connected to a power supply and to a first pixel of the first array; and
a first common connector pad connected to the panel, at a first distance away from the contact ledge, to provide a common voltage to the panel, the first common connector pad electrically connected to a second pixel of the first array to receive the electrical current from the electrical connector through the first trace.

18. The display of claim 17, wherein the plurality of pixels further includes a second array of pixels electrically interconnected to form a second trace that conducts an electric current from a first end of the second trace through the second array of pixels to a second end of the second trace, the first end of the second trace being electrically connected to the electrical connector;

the display further comprising a second common connector pad connected to the panel, at a second distance away from the contact ledge, to provide the common voltage to the panel in cooperation with the first common connector pad, the second common connector pad electrically connected to the second end of the second trace to receive the electrical current from the electrical connector through the second trace.

19. The display of claim 15, wherein the plurality of pixels includes a plurality of pixel arrays including the first array, each pixel array comprising a corresponding plurality of routing pixels electrically interconnected in series to conduct at least a portion of the electric current, the plurality of pixel arrays being electrically connected in parallel to form the first trace.

20. The display of claim 15, further comprising:
a gate metal layer deposited on the panel and etched into a plurality of electrically isolated portions each associated with a corresponding pixel of the first array of pixels;
an insulating layer deposited on the panel over the gate metal layer; and
a source-drain metal layer deposited on the panel over the gate metal layer and the insulating layer and etched into a plurality of electrically interconnected portions each associated with a corresponding pixel of the first array of pixels.

\* \* \* \* \*